(12) United States Patent
Janz et al.

(10) Patent No.: US 8,372,769 B2
(45) Date of Patent: Feb. 12, 2013

(54) YTTRIA-BASED REFRACTORY COMPOSITION

(75) Inventors: Peter Janz, Klagenfurt (AT); Sigrun Tauber, St. Veit an der Glan (AT)

(73) Assignee: Treibacher Industrie AG, Triebach-Althofen (AT)

( * ) Notice: Subject to any disclaimer, the term of this patent is extended or adjusted under 35 U.S.C. 154(b) by 0 days.

(21) Appl. No.: 13/114,529

(22) Filed: May 24, 2011

(65) Prior Publication Data

US 2011/0294651 A1   Dec. 1, 2011

Related U.S. Application Data

(62) Division of application No. 12/443,017, filed as application No. PCT/AT2008/000173 on May 15, 2008, now Pat. No. 8,025,094.

(30) Foreign Application Priority Data

May 15, 2007  (EP) ..................................... 07450090

(51) Int. Cl.
*C04B 35/51*  (2006.01)

(52) U.S. Cl. ..... 501/152; 501/105; 501/151; 106/38.22; 106/38.27; 106/38.9

(58) Field of Classification Search .................. 501/105, 501/151, 152; 106/38.22, 38.27, 38.9
See application file for complete search history.

(56) References Cited

U.S. PATENT DOCUMENTS

| 7,833,924 B2 * | 11/2010 | Kobayashi et al. | ........... 501/152 |
| 7,915,189 B2 * | 3/2011 | Kobayashi et al. | ........... 501/152 |

FOREIGN PATENT DOCUMENTS

| JP | 04059658 | * | 2/1992 |
| JP | 05294724 | * | 11/1993 |

OTHER PUBLICATIONS

Udalova et al "Compaction Kinetics of Lithium Fluoride Doped Yttrium Oxide", The institute of Electrical Engineers, Stevenage, Sep. 1979.*

* cited by examiner

*Primary Examiner* — Karl Group
(74) *Attorney, Agent, or Firm* — Workman Nydegger

(57) ABSTRACT

Method for producing a mold for use in casting reactive metals comprising preparing a slurry of a yttria-based refractory composition and a binder, and using said slurry as a mold facecoat by applying said slurry onto a surface of a mold pattern, wherein said yttria-based refractory composition is obtainable by (a) mixing particles of a yttria-based ceramic material and a fluorine containing dopant, and (b) heating the resulting mixture to effect fluorine-doping of said yttria-based ceramic material.

11 Claims, 12 Drawing Sheets

YTTRIA-BASED REFRACTORY COMPOSITION

CROSS REFERENCE TO RELATED APPLICATION

The present application is a divisional of U.S. application Ser. No. 12/443,017, filed on Apr. 23, 2009, which issued as U.S. Pat. No. 8,025,094, which is a U.S. National Phase of International Application No. PCT/AT2008/000173, filed May 15, 2008, which claims the benefit of European Application No. 07450090.1, filed May 15, 2007. The disclosures of the foregoing applications are incorporated herein in their entirety.

BACKGROUND OF THE INVENTION

1. Field of the Invention

The present invention concerns a yttria-based refractory composition for use in producing slurries needed for producing ceramic molds for use in casting reactive metals.

2. Description of Prior Art

Aqueous suspensions of ceramic particles, such as yttrium oxide, zirconium oxide, yttria-alumina-zirconia, alumina, and zircon are used industrially to form ceramic articles due to their suitability for use as structural materials at high temperatures. These refractory materials often are also used for casting super alloys and reactive metals.

An example of such a reactive metal is titanium. Titanium normally reacts with materials used to form the mould, such as oxides, thereby releasing oxygen and forming oxygen-enriched titanium. A suspension is a system in which typically solid particles are uniformly dispersed in a liquid such as water. Particles in the order of less than about 1 µm can be classified as colloidal particles and a suspension of such particles is referred to as a colloidal suspension. Such suspensions are used as ceramic slurries for different purposes, as mentioned above. Ceramics normally are at least partially soluble in water. Furthermore ceramics tend to hydrate, forming a bond with water. To what extent and how quickly ceramics dissolve or hydrate, varies. Moreover, colloidal particles of ceramics may agglomerate in water. The extent to which ceramics dissolve, hydrate or agglomerate in water based systems depends on many factors, including the nature of the ceramic powder, the oxidation state of the ceramic, the pH; the temperature of the system and the dispersants which are used.

A lot of methods are known in the art to stabilize colloidal suspensions i.e. preventing the suspensions from agglomerating, while simultaneously reducing the dissolution and hydration rates. For instance, three known mechanisms include electrostatic, steric and electrosteric mechanisms. These mechanisms are reviewed in detail by Cesarano and Aksay "Stability of Aqueous Alpha-$Al_2O_3$ Suspensions with Poly-(methacrylic acid) Polyelectrolyte", J. Am. Ceram. Soc. 71 p 250-255 (1988).

In the U.S. Pat. No. 5,624,604 to Yasrebi et al. it is told that besides colloidal dispersion, reducing the attack of water (i.e. hydration and/or solvation) on the ceramic particle also is an important consideration for making commercially suitable ceramic slurries. Ceramic materials normally react with water and either partially dissolve (referred to as dissolution or solvation) or form hydrates. The extent of dissolution or hydration varies among different ceramic materials. As ceramic materials dissolve, the dissolved species may substantially change the ionic strength of the solution and consequently agglomerate the particles. In the case of particle hydration, some ceramics form a hydroxide surface layer. However, attack by water also may proceed farther than the surface layer and may advance into the body of the particle. As a result, size, morphology and the crystal phase of the particles may change.

In many commercially important ceramics, such as alumina ($Al_2O_3$), zirconia ($ZrO_2$), and zircon ($ZrSiO_4$) to name a few, the dissolution rate and the extent to which dissolution proceeds is low enough so that it does not seem to interfere with their aqueous commercial use; at least under mild acidic or basic conditions such as from about pH 3 to about pH 11. Furthermore, hydration does not seem to form more than a thin surface layer, at least when the particle size is equal to or larger than one micrometer. However, other commercially important ceramics, such as magnesia (MgO), yttria-alumina-zirconia, and $Y_2O_3$ (yttria), dissolve in an aqueous media to much larger extent and at faster rates than the ceramic materials discussed above. As a result, aqueous processing of these materials such as magnesia, calcia, yttria, yttria-alumina-zirconia is either difficult or even not practicable. Many attempts have been made by persons skilled in the art of ceramic processing to reduce the dissolution and hydration of ceramic particles, while simultaneously keeping the ceramic particles dispersed (unagglomerated) in suspensions. For example, Horton's U.S. Pat. No. 4,947,927 teaches that by adjusting the pH of a yttria slurry to high pH values in excess of pH 11 one can make yttria intrinsically less soluble in water, thereby decreasing its sensitivity to water attack.

Compared to electrostatic stabilization, electrosteric stabilization provides a better method for simultaneously dispersing colloidal particles in suspension and reducing water attack on the ceramic surface.

The limitations of this method were presented by Nakagawa, M. Yasrebi, J. Liu and I. A. Aksay ("Stability and Aging of Aqueous MgO Suspensions") at the annual meeting of the Am. Ceram. Soc. (1989). Also monomers have been used to prevent the agglomeration of alumina suspensions. Graule et al. "Stabilization of Alumina Dispersions with Carboxyclic Acids". Proceedings of the Second European Ceramic Society Conference (1991).

U.S. Pat. No. 5,624,604 Yasrebi et al. teaches a method for dispersing and reducing the rate of dissolution and/or hydration of colloidal ceramic suspensions by adding a non polymeric hydroxylated organic compound to a ceramic suspension. The ceramic suspension typically comprises a colloidal suspension of a metal oxide wherein the metal of the metal oxide is an alkali metal, alkaline-earth metal or rare-earth metal but preferably is magnesium, calcium or a rare-earth metal.

Other methods for increasing the lifetime of a casting slurry are described in U.S. Pat. No. 6,390,179 by Yasrebi et al., thus one feature of the invention is processing refractory powders at a first hydration level to produce powders having a second, lower hydration level before the processed materials are used to form casting slurries. Processing according to the disclosed methods results in a substantial increase in the lifetime of a slurry made using such processed materials compared to slurries made using materials not processed as described herein.

U.S. Pat. No. 5,464,797 describes an aqueous ceramic slurry having from about 70-weight percent to about 85 weight percent of a fused yttria-zirconia material. The weight-percent of zirconia in the fused yttria-zirconia preferably varies from about 1, 0 weight percent to about 10 weight percent. The slurries of the present invention are used to form ceramic mold facecoatings for casting reactive materials.

These slurries are less sensitive to pH-fluctuations than slurries made from 100 percent yttria (yttria slurries).

Thus, it is understood that persons skilled in the art of ceramic processing have long searched for, and developed methods to increase the lifetime of casting slurries. Despite the prior inventions directed to this objective, there still is a need for convenient and practical methods for increasing the useful lifetimes of investment casting slurries in particular when using other (amongst others Ammonium Zirconium Carbonate, Zirconium Acetate), not colloidal silica based new binder systems to process such slurries.

In the U.S. Pat. No. 5,827,791 Pauliny et al focused yttria-based slurries for use in producing ceramic molds for use in the investment casting of reactive metals, particularly titanium and titanium, alloys, where the specific preferred binders amongst colloidal silica are ammonium zirconium carbonate and zirconium acetate.

Remet Corporation, a leading company in providing binders for the Precision Investment Casting Industry, offers Ammonium Zirconium Carbonate (Ticoat®-N) and cites that it is an effective binder system specifically for titanium castings. Remet Corporation also offers Colloidal Zirconia, that is defined as an acetate stabilized binder for high temperature applications.

In the U.S. Pat. No. 4,740,246 Feagin focused relatively unreactive mold coatings with titanium and titanium alloys that are prepared from zirconia or yttria sols, or mixtures thereof as a binder for refractory such as zirconium oxide, yttrium oxide and mixtures thereof. Feagin cites an example, where a cast-sample was made of a slurry containing yttrium oxide and zirconium acetate as essential parts. This sample is very low in alpha case being less than 0.001 inch.

From U.S. Pat. No. 4,057,433 a mold for casting molten reactive metals is known, which has a facing portion comprising finely divided particles of the oxyfluorides of the metals of Group IIIa and a back-up portion comprising finely divided particles of shell mold back-up material.

The Institution of Electrical Engineers, Stevenage, GB; September 1979 (1970-09), Udalova L. V. at AL describe the compaction kinetics of Y2O3 doped with 0.4-3.0 wt % LiF at 20-1250° C. and a specific pressure of 1000 kg/cm$^2$.

Takashima M. published in the Journal of Fluorine Chemistry; Elsevier Sequoia, Lausanne, CH, vol. 105, no. 2, September 2000, pages 249-256 an article about the "Preparation and properties of binary rare-earth oxide fluorides" which are obtained by the solid-solid reaction between rare-earth oxide and fluoride at a temperature higher than 1000° C.

The Institution of Electrical Engineers, Stevenage, GB; November 1980 (1980-11), Udalova L. V. et al; describe in the published article "General features of compaction of powders of certain Lithiumfluoride doped powders" the reaction of pure yttrium oxide powder with lithium fluoride powder upon compaction at high pressure at room temperature.

SUMMARY OF THE INVENTION

In accordance with the invention and to achieve the objects thereof, the present invention is directed to a method for producing a mold for use in casting reactive metals comprising preparing a slurry of a yttria-based refractory composition and a binder, and using said slurry as a mold facecoat by applying said slurry onto a surface of a mold pattern, wherein said yttria-based refractory composition is obtainable by
(a) mixing particles of a yttria-based ceramic material and a fluorine containing dopant, and
(b) heating the resulting mixture to effect fluorine-doping of said yttria-based ceramic material.

A preferred embodiment of said method is, wherein said yttria-based ceramic material comprises 50-100 wt.-% $Y_2O_3$, 0-50 wt.-% $Al_2O_3$ and 0-50 wt.-% $ZrO_2$.

A more preferred embodiment of said method is, wherein said yttria-based ceramic material is $Y_2O_3$, a Y/Al/Zr-oxide, a Y/Al-oxide or a Y/Zr-Oxide or combinations thereof.

Another embodiment of said method is, wherein said fluorine containing dopant is one of the group consisting of $YF_3$, $AlF_3$, $ZrF_4$, a lanthanide fluoride and a zirconiumoxyfluoride.

Another more preferred embodiment of said method is, wherein said yttria-based refractory composition contains 0.10-7.5; preferably 1.0-7.5 mass-% fluorine.

In addition to that, the present invention is directed to a method for casting reactive metals comprising preparing a mold according to the method described above and casting said reactive metals using said mold.

The present invention is also directed to a Yttria-based refractory composition obtainable by
(a) mechanically mixing particles of a yttria-based ceramic material and a fluorine containing dopant other than an alkaline fluoride, and
(b) heating the resulting mixture to a temperature within the range of 300-800° C. to effect fluorine-doping of said yttria-based ceramic material.

A preferred embodiment of said Yttria-based refractory composition can be obtained from a yttria-based ceramic material comprising 50-100 wt.-% $Y_2O_3$, 0-50 wt.-% $Al_2O_3$ and 0-50 wt.-% $ZrO_2$.

Said Yttria-based refractory ceramic material preferably is $Y_2O_3$, a Y/Al/Zr-oxide, a Y/Al-oxide or a Y/Zr-Oxide or combinations thereof.

Preferred embodiments for said fluorine containing dopant are $YF_3$, $AlF_3$, $ZrF_4$, a lanthanide fluoride and a zirconiumoxyfluoride.

Another preferred embodiment of said Yttria-based refractory composition contains 0.1-7.5, preferably 1.0-7.5 mass-% fluorine.

The present invention is also directed to a method for producing a mold for use in casting reactive metals comprising preparing a slurry of a yttria-based refractory composition according to present invention and a binder, and using said slurry as a mold facecoat by applying said slurry onto a surface of a mold pattern.

In addition to that, the present invention is directed to a method for casting reactive metals comprising preparing a mold according to the method described above and casting said reactive metals using said mold.

DETAILED DESCRIPTION OF THE INVENTION

Figure 1:
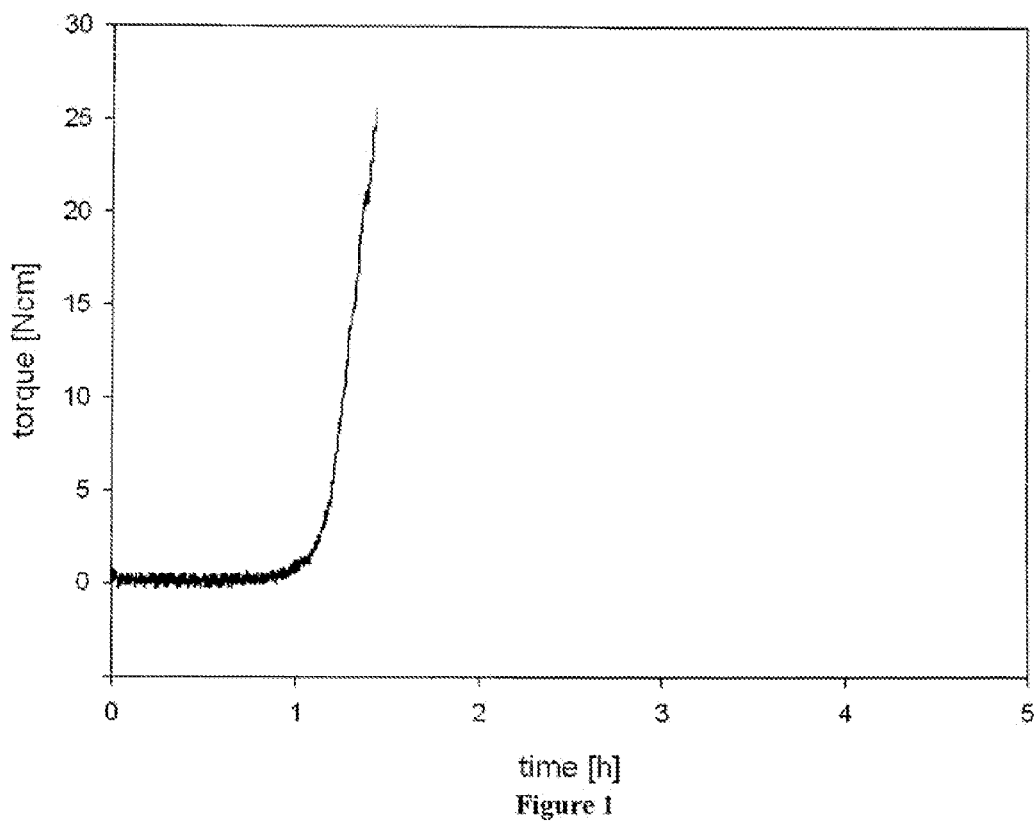
FIG. 1 shows the results of the slurry-lifetime-test (Method A) with Y/Al/Zr-Oxide in Ammonium Zirconium Carbonate and de-ionized water (graph-time versus torque).

The present invention provides new yttria-based materials for increasing the lifetime of casting slurries. One feature of the invention is processing such refractory powders which exhibit a significantly reduced rate of dissolution and/or hydration, when used in colloidal ceramic suspensions. This can be accomplished at any pH according to the present invention, thereby making it possible to reduce the aging of rare earth based slurries considerably.

The present invention also encompasses the use of compositions comprising an aqueous slurry of yttria-based particles doped with an amount of fluor effective to reduce the dissolution rate of the particles mentioned above. One skilled in the art will realize that an "effective amount" may vary from composition to composition. However, an effective amount typically means an amount of at least about 0.1 weight percent. Yttria-based refractory composition according to the present invention contain at least 0.1 wt.-% fluorine.

The dopant material is a fluoride or oxyfluoride or compounds that form such dopants as mentioned above upon further processing, wherein these fluorides or oxyfluorides are of metals especially selected from the group consisting of aluminium, zirconium, yttrium and lanthanides.

Doped yttria ($Y_2O_3$), yttria alumina (Y/Al-oxide), yttria alumina zirconia (Y/Al/Zr-oxide) or yttria zirconia (Y/Zr-oxide) particles according to the present invention are not simply a binary mixture of the dopant and yttria or yttria-alumina-zirconia or yttria-zirconia. Instead, the phrase "doped particles" or similar phrases used herein, refers to an intimate mixture of yttria or yttria-alumina-zirconia or yttria-zirconia or yttria-alumina. "Intimately mixed" or "intimate mixture" is used to differentiate binary mixtures that result simply from the physical combination of two components. Typically, an "intimate mixture" means that the dopant material is atomically dispersed in yttria or yttria-alumina-zirconia or yttria-zirconia such as with a solid solution or as small precipitates in the crystal matrix of the solid yttria or yttria-alumina-zirconia or yttria-zirconia or yttria-alumina.

Alternatively, an intimate mixture may refer to compounds that are fused, such as, yttria or yttria-alumina-zirconia or yttria-zirconia or yttria-alumina. By way of example and without limitation, the dopants may be intimately mixed with yttria or yttria-alumina-zirconia or yttria-zirconia or yttria-alumina in the following ways: 1. finely dispersed in the yttria or yttria-alumina-zirconia or yttria-zirconia or yttria-alumina matrix or 2. provided as a coating on the surface of such particles or provided as a diffused surface layer of dopant on the outer surface of yttria or yttria-alumina-zirconia or yttria-zirconia or yttria-alumina particles. The dopant may be in solid solution with the matrix, or it may be in the form of small precipitates in the crystal matrix, or it may be a coating on the surface of the particle or portions thereof.

Without limiting the scope of this invention to one theory of operation, it is currently believed that the dopant shields dissolution sites on the surface of the yttria or yttria-alumina-zirconia or yttria-zirconia or yttria-alumina from attack by solvent molecules, such as water. In other words, the dissolution and/or hydration of these particles primarily is a surface reaction, and the dopant interferes with this surface reaction. Consequently, the dissolution rate of yttria or yttria-alumina-zirconia or yttria-zirconia or yttria-alumina is decreased due to the formation of yttrium oxyfluorides, on the surface of the above mentioned refractory powders.

For this reason and in the absence of any particle breakage, only a minor portion of the outer surface regions of the refractory powders related to this invention actually need to be doped. This means that the core of the particle may remain substantially pure yttria, yttria alumina, yttria alumina zirconia or yttria zirconia.

In the following, a general description of the production process of the preferred F doped yttria-based ceramic materials is given.

The dopant (a fluorine-containing substance, for instance $YF_3$, zirconium oxyfluoride, $AlF_3$) is added to the raw material flour (preferred: yttria, yttria-alumina-zirconia, yttria-zirconia, yttria-alumina). In order to distribute the two flours homogenously, they are accurately blended respectively ground together and afterwards sieved. Subsequently the flour-mixture is heated, e.g. calcined to form a YOF-surface layer on the outer surface of the ceramic particles.

In the present invention F-doped Yttria-based refractories are produced at a preferred temperature range from 300 to 800 degrees. Treating the F-doped materials at a temperature higher than 800 degrees (Takashima M. describes in "Preparation and properties of binary rare-earth oxide fluorides" by Takashima M. temperatures higher than 1000° C.) causes a decrease of slurry stability of the F-doped Yttria based refractory in water based binder systems.

Contrary to the publication "General features of compaction of powders of certain Lithium fluoride doped powders", where the powder and the dopant (Lithium fluoride) are mixed chemically; the fluorine containing dopant and the Yttria-based flour are mixed mechanically in the present invention. Furthermore no specific pressure is used for the production of the preferred Yttria-based refractories as described in the publication mentioned above and as described in "Compaction kinetics of Lithium fluoride-doped Yttrium oxide" written by Udalova et al.

Lithium fluoride and alkali metals are not used as dopants according to the present invention, due to their negative effect on the slurry stability in water-based binder systems.

EXAMPLES

To further illustrate the production of F-doped $Y_2O_3$, Y/Al/Zr-Oxide, Y/Zr-Oxide, Y/Al-Oxide and their effect on increasing the slurry lifetime following examples and the results of their slurry lifetime-tests are provided. The fluorine-contents that are indicated in the examples accord to the results of the chemical analysis of the materials used. The analysis was made by realising soda respectively soda potash pulping and by using an ion selective electrode.

First the two methods that were used for detecting the slurry lifetime, are described.

1. Measurement of the Torque—Method A
   The experimental setup consists of
   double jacket assay container made of stainless steel (inner diameter=5 cm, external diameter=7 cm), a Plexiglas cap and sealing member (stainless steel) therefore. In the middle of the cap there is a hole (bore=0.9 cm) for the mixer (shaft diameter=0.8 cm). The cap is sealed up with a grommet.
   agitator (IKA EUROSTAR power control-visc P4) and a horseshoe mixer (width=4.5 cm, altitude=5.5 cm)
   measuring instrument for detecting the dynamic torque, which acts on the agitating element (IKA VISKOKLICK® VK 600 control). The measuring unit transforms the dynamic into a static torque.
   thermostat (LAUDA ecoline RE 106)
   software labworldsoft 4.01

First the slurry is formulated (exact composition of the slurry see description of the examples) and then filled into the double jacket assay container, which is temperature controlled at 25° C. by a thermostat. The agitator with a horseshoe mixer works with a constant rotation speed of 30 revolutions per minute. The horseshoe mixer is positioned just 1-2 mm above the bottom of the assay container. At the beginning of the test the torque is reset and then recorded over time. Therewith the developing of the relative viscosity can be observed. For analysis the point of the first significant increase in slope is defined as the slurry-lifetime.

2. Measurement of the Cinematic Viscosity Using Zahn Cup Respectively Measurement of the Dynamic Viscosity Using Rheometer—Method B
   The experimental setup consists of
   a roller
   Polyethylen-bottle (2 L) (Bartelt) with cap
   Zahncup Nr. 4 (ERICHSEN GMBH & CO KG) respectively Rheometer Physica MCR 301 (Anton Paar GmbH)—Plate-Plate-System (PP50; measuring gap=0.5 mm unless otherwise noted; measuring temperature=25° C., viscosity value at a shear rate of 100/s).

Powder and binder (exact composition of the slurry see description of the examples) are mixed in the PE-bottle with an agitator and then put on the roller that has a constant rotation speed. The rotation speed of the bottle is 16.5 rpm. The slurry is stirred uniformly at room temperature and after one hour of stirring the start-viscosity is measured with Zahncup Nr. 4-unless otherwise noted (determining the efflux time and convert it to the cinematic viscosity according to the adequate formula of ASTM D 4212) or/and with the Rheometer. In certain time intervals (~every 3-5 hours) and when the viscosity starts to increase, viscosity-measurements are done every two respectively every hour. For analysis the doubling of the start viscosity [cSt] is defined as the slurry lifetime. If the doubling of the viscosity takes place between two measurements, a straight line is built between these two measuring points, and the value of the doubling of the viscosity is calculated from the linear equation.

Slurry Composition

In the present invention the slurry is formed by mixing an aqueous based binder with e.g. yttria, yttria-alumina-zirconia, yttria-alumina or yttria-zirconia. The preferred binders are
   Ammonium Zirconium Carbonate solution which finds use as a binder for titanium alloy casting (Ticoat®-N)
   Zirconium Acetate, an acetate stabilized Zirconia sol (binder).

Production of Yttria-Alumina-Zirconia

Appropriate quantities of $Y_2O_3$, $ZrO_2$ and $Al_2O_3$ are mixed, put into an electric furnace and fused at the melting temperatures of the materials. After this operation the melt is cooled to get an ingot. The ingot obtained is crushed into particles of below 3 mm using a jaw crusher. Afterwards the particles are annealed.

COMPARATIVE EXAMPLES

Results of Slurry-Lifetime-Tests with Standard Materials

Measurement of the Torque—Method A

Comparative Example 1

250 g of fused Y/Al/Zr (95.88/0.12/4.0) flour (TIAG) were mixed with 44.8 g of Ammonium Zirconium Carbonate and 22.11 g de-ionised water. The start viscosity of the slurry didn't change for 0.9 hour, but then the torque and therewith the viscosity increased dramatically. After 1.4 hours the torque rose up to 25 Ncm (FIG. 1).

Comparative Example 2

Figure 2:
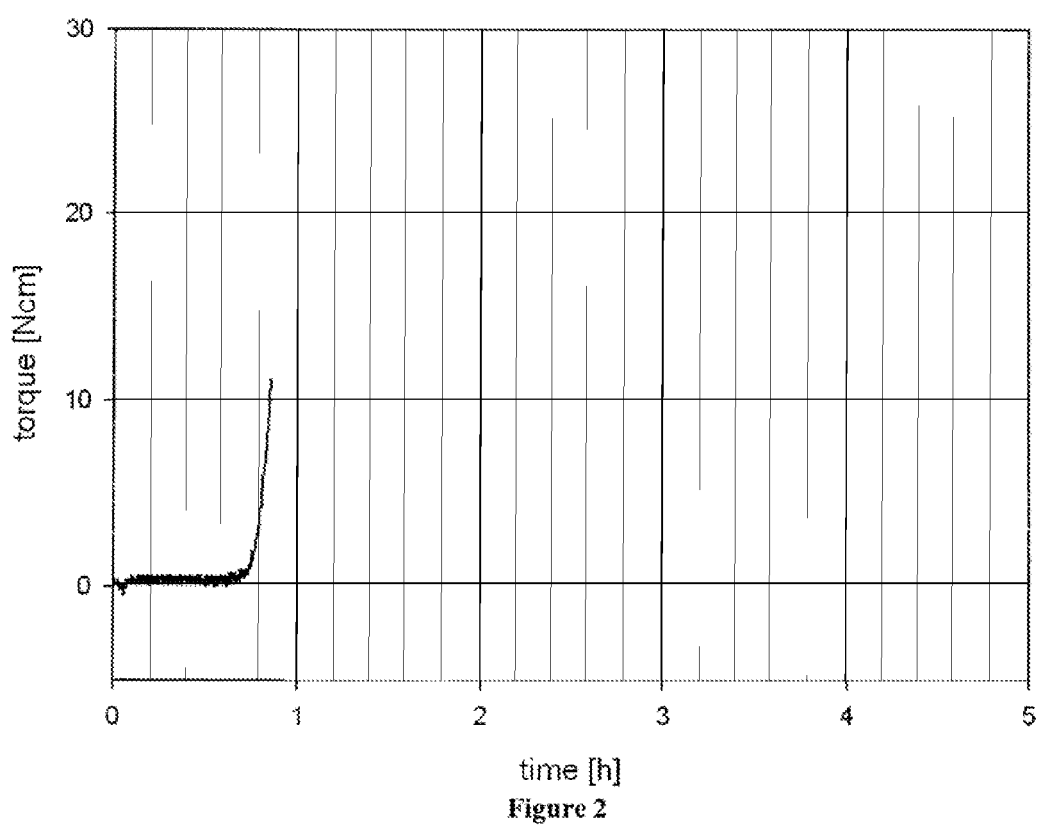
FIG. 2 shows the results of the slurry-lifetime-test (Method A) with Y/Al/Zr-Oxide in Zirconium-Acetate and de-ionized water (graph-time versus torque).

250 g of fused Y/Al/Zr (95.88/0.12/4.0) flour (TIAG) were mixed with 44.8 g of Zirconium Acetate and 22.11 g de-ionised water. The start viscosity of the slurry didn't change for 0.7 hours, but then the torque and therewith the viscosity increased dramatically (FIG. 2).

Measurement of the Viscosity Using Zahncup Respectively Using Rheometer—Method B Comparative Example 3

1200 g of fused Y/Al/Zr-Oxide (95.88/0.12/4.0) flour (TIAG) were mixed with 360 g of Ammonium Zirconium Carbonate.

Figure 3:
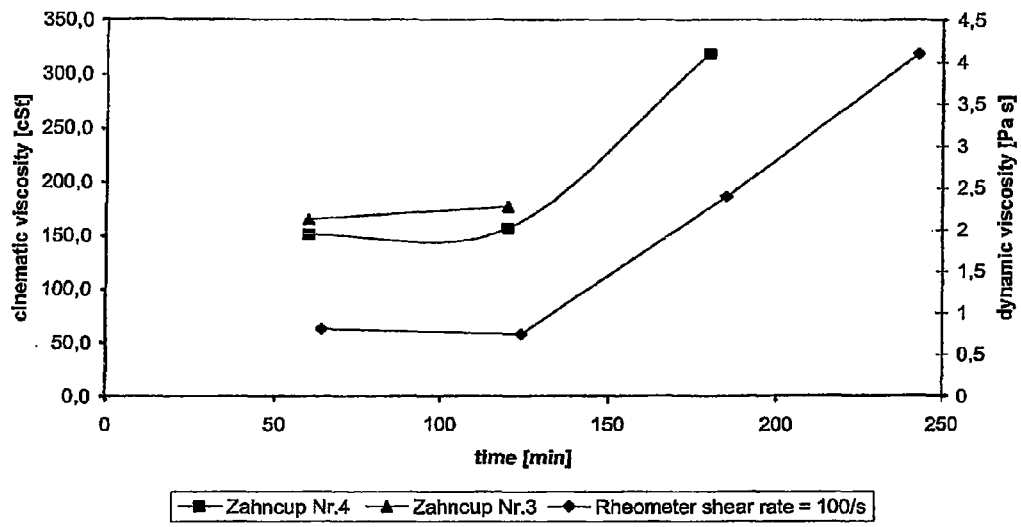
FIG. 3 shows the results of the slurry-lifetime-test (Method B) with Y/Al/Zr-Oxide in Ammonium Zirconium Carbonate (graph-time versus cinematic viscosity respectively time versus dynamic viscosity).

Because of the low start viscosity of the slurry, Zahncup measurements with Zahncup Nr. 3 and 4 were done. Accessorily viscosity measurements with the Rheometer were realised. You can see the results in FIG. 3. After three hours the start-viscosity increased by 112 percent (Zahncup 4). At this point no reproducible measurements could be realised with Zahncup Nr. 3 because of the high slurry viscosity. After 4 hours the efflux time of the slurry couldn't be determined likewise with Zahncup Nr. 4 anymore (efflux time>2 minutes).

Comparative Example 4

Figure 4:
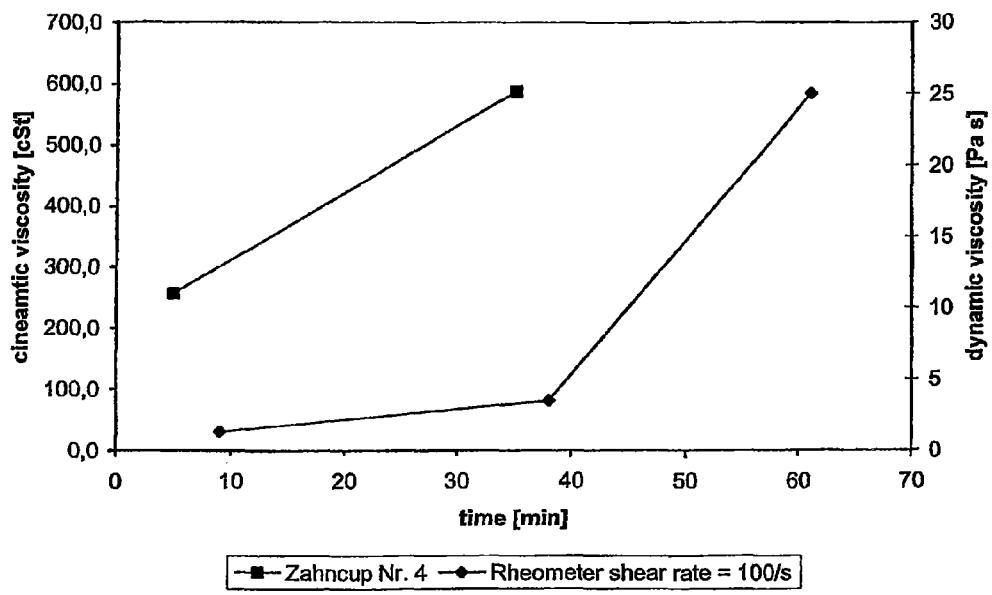
FIG. 4 shows the results of the slurry-lifetime-test (Method B) with YlAl/Zr-Oxide in Zirconium-Acetate (graph-time versus cinematic viscosity respectively time versus dynamic viscosity).

1200 g of fused Y/Al/Zr-Oxide (95.88/0.12/4.0) flour (TIAG) were mixed with 300 g of Zirconium Acetate. Viscosity measurements were made with Zahncup Nr. 4 and Rheometer. You can see the results in FIG. 4. Because of the rapid increase of the viscosity, the start viscosity was measured after 5 minutes of stirring using the roller. After 35 minutes the start viscosity increased by 128 percent, after 60 minutes the slurry could not be measured with Zahncup Nr. 4 anymore, the viscosity increased dramatically.

Comparative Example 5

Figure 5:
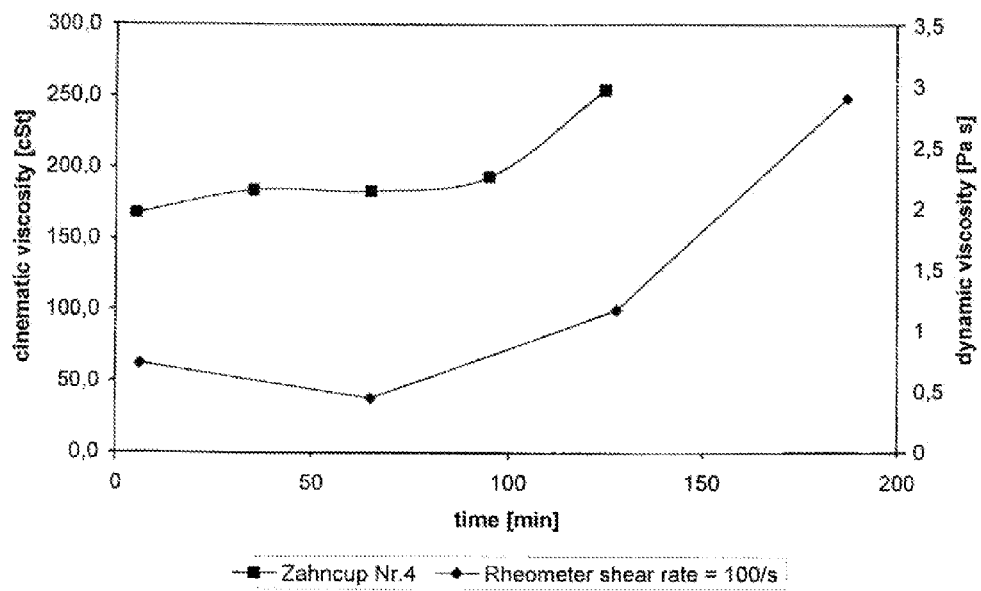
FIG. 5 shows the results of the slurry-lifetime-test (Method B) with Yttria in Ammonium Zirconium Carbonate (graph-time versus cinematic viscosity respectively time versus dynamic viscosity).

1200 g of fused Yttria flour (TIAG) were mixed with 360 g of Ammonium Zirconium Carbonate. Viscosity Measurements were made with Zahncup Nr. 4 and Rheometer. After 125 minutes the start viscosity increased by 39.2%, after 185 minutes the slurry could not be measured with Zahncup Nr. 4 anymore (efflux time>2 min), the viscosity increased dramatically. (FIG. 5)

With the following examples the invention is described in more detail:

Example 1

6.85 kg fused block material of Y/Al/Zr (95.88/0.12/4.0) were milled for 90 minutes in a $ZrO_2$-lined ball mill (ZOZ GmbH TYP COMB 03-A03). Therefore 25 kg 1.25" grinding-balls (Yttria stabilized Zirconium Oxide) were used. After the addition of 150.5 g (=2.15 wt %) Yttriumfluoride the powder mixture was milled for another 60 minutes. The milled product was sieved <45 μm and then calcined (Nabertherm C250) in $Al_2O_3$(0.9)-mullite(0.1)-crucibles (1.5 kg per crucible). The heating rate was 5° C./min up to a temperature of 550° C. that was maintained for 6 hours 50 min.

Life Time Test (Method A)

Figure 6:
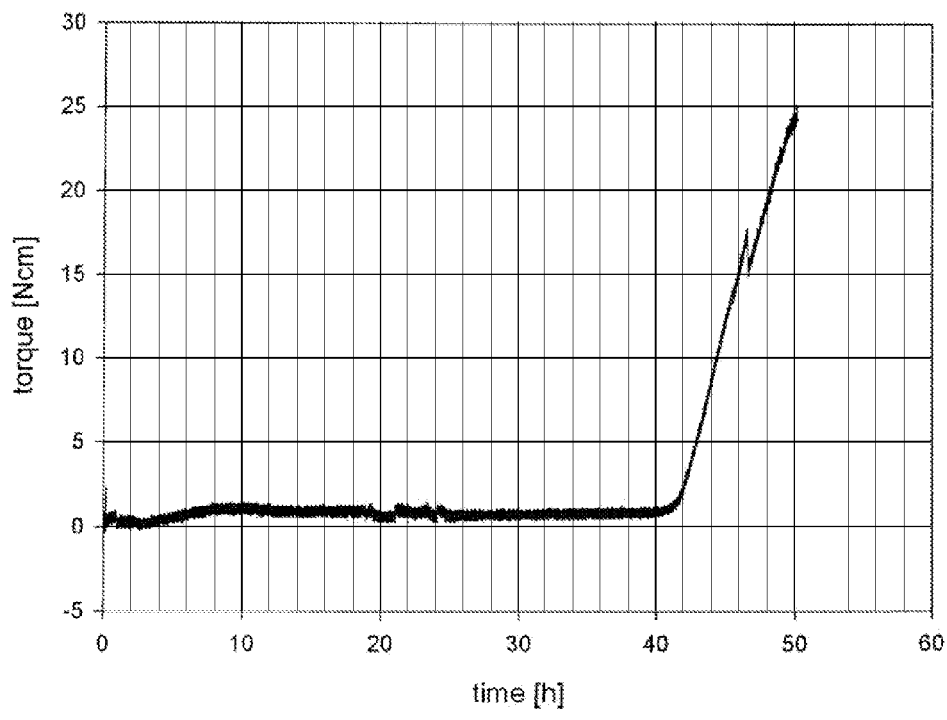
FIG. 6 shows the results of the slurry-lifetime-test (Method A) with 0.8 wt % F-doped Y/Al/Zr-Oxide in Zirconium-Acetate and de-ionized water (graph-time versus torque).

250 g of the 0.8 wt % F-doped material were mixed with 44.8 g of Zirconium Acetate and 22.11 g de-ionised water. The slurry lifetime was 41 hours. (FIG. 6). From this time on the viscosity increased sharply. After 50 hours a torque of 25 Ncm was achieved.

Example 2

Powder-production was performed according to Example 1.

Life Time Test (Method A)

Figure 7:
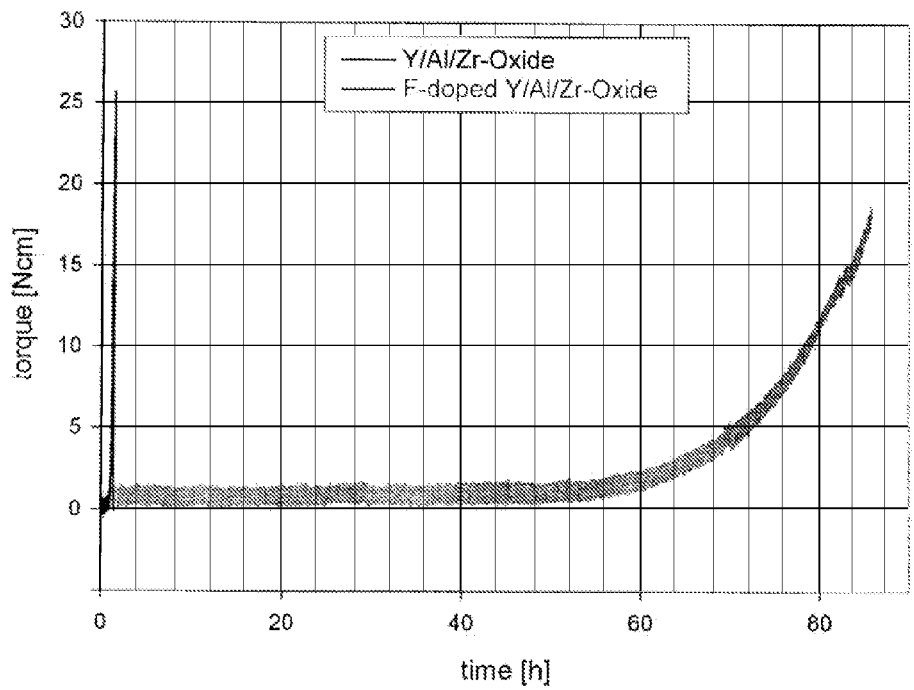
FIG. 7 shows the results of the slurry-lifetime-tests (Method A) in comparison of Y/Al/Zr-Oxide to 0.8 wt % F-doped Y/Al/Zr-Oxide in Ammonium Zirconium Carbonate and de-ionized water (graph-time versus torque).

250 g of 0.8 wt % F-doped material were mixed with 44.8 g of Ammonium Zirconium Carbonate and 22.11 g de-ionised water. The slurry lifetime accounted for 56 hours (see FIG. 7: Example 2 in comparison to the untreated Y/Al/Zr-Oxide).

Example 3

Powder-Production

Fused Y/Al/Zr-Oxide-flour (95.88/0.12/4.0) was milled with 3.3 wt % Zirkonylfluoride with a planetary mill ($ZrO_2$ grinding jars and balls) for 10 minutes. The weighted sample was 96.7 g Y/Al/Zr-flour and 3.3 g Zirkonylfluoride per grinding jar-four jars were used. (production of Zirkonylfluoride by fractionally converting Zirconium Carbonate with HF and following calcination at 450° C. for 4 hours). The powder mixture was calcined in a $ZrO_2$-crucible at 550° C. for 3 hours using a muffle kiln (Heraeus Holding GmbH MR 170 E).

Life Time Test (Method A)

Figure 8:
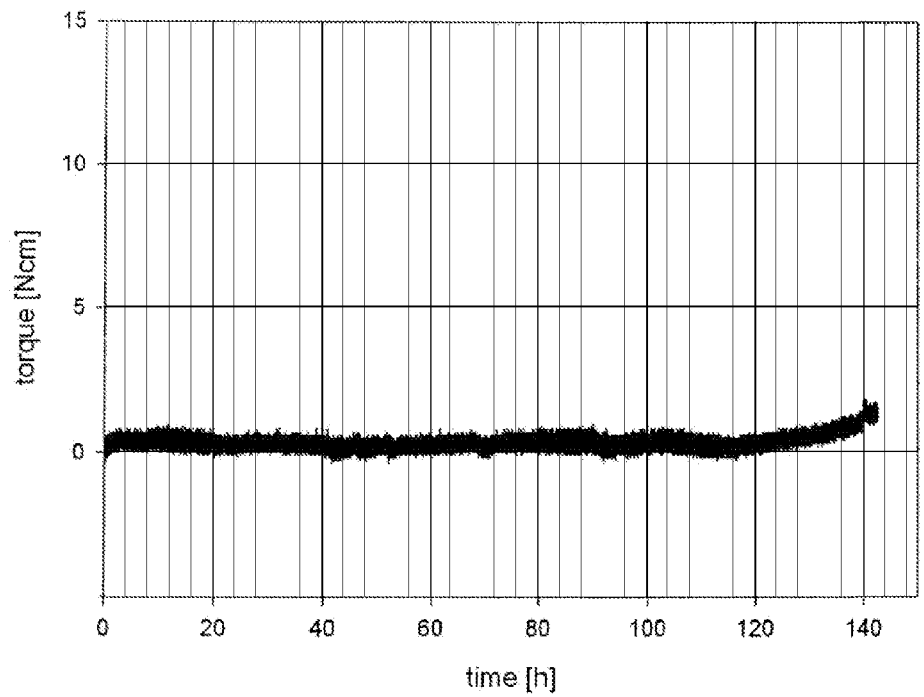
FIG. 8 shows the results of the slurry-lifetime-test (Method A) with 1.0 wt % F-doped Y/Al/Zr--Oxide in Ammonium Zirconium Carbonate and de-ionized water (graph-time versus torque).

250 g of the 1.0 wt % F-doped material were mixed with 44.8 g of Ammonium Zirconium Carbonate and 22.11 g de-ionised water. The slurry lifetime added up to 124 hours. (see FIG. 8)

Example 4

Powder-Production

Raw materials and milling parameters according to Example 1. The milled product was sieved <45 μm and then calcined (High temperature kiln) in $Al_2O_3$(0.9)-mullite(0.1)-crucibles (1.5 kg per crucible). The heating rate was 5° C./min up to a temperature of 540° C. that was maintained for 8 hours.

Life Time Test (Method A)

250 g of 0.9 wt % F-doped material were mixed with 62.5 g of Zirconium Acetate. The slurry lifetime was 66 hours.

Example 5

Fused Y/Al/Zr-Oxide-flour (95.88/0.12/4.0) was milled with 2.2 wt % Zirkonium(IV)fluoride (99.9%—Sigma Aldrich) with a planetary mill ($ZrO_2$ grinding jars and balls) for 10 minutes. The weighted sample was 107.6 g Y/Al/Zr-flour and 2.4 g Zirkonium(IV)fluoride per grinding jar—four jars were used. The powder mixture was calcined in a $ZrO_2$-crucible at 550° C. for 3 hours using a muffle kiln (Heraeus Holding GmbH MR 170 E).

Life Time Test (Method A)

250 g of the 0.8 wt % F-doped material were mixed with 44.8 g of Ammonium Zirconium Carbonate and 22.11 g de-ionised water. The slurry lifetime was 380 hours.

Example 6

6.490 kg fused block material of Yttria were milled for 30 minutes in a ball mill (ZOZ GmbH TYP COMB 03-A03; 20 kg 1.25" grinding-balls (Yttria stabilized Zirconium Oxide other milling parameters as described in Example 1). After the addition of 0.510 kg (=7.3 wt %) Zirconiumoxyfluoride $Zr_7O_{8.79}F_{9.71}$ the powder mixture was milled for another 90 minutes. The milled product was sieved <63 μm and 399.5 g were calcined in a $ZrO_2$-crucible at 400° C. for 4 hours using a muffle kiln (Heraeus Holding GmbH MR 170 E).

Life Time Test (Method A)

250 g of the 1.9 wt %-F-doped material were mixed with 75 g of Ammonium Zirconium Carbonate. A significant increase of the measured torque could not be observed for more than 335 hours. Afterwards the experiment was stopped.

Example 7

Yttium-Oxide-flour was milled with 2.7 wt % Lithium fluoride (99.995%—Sigma Aldrich) with a planetary mill ($ZrO_2$ grinding jars and balls) for 10 minutes. The weighted sample was 97.3 g Yttria and 2.7 g Lithium fluoride per grinding jar. The powder mixture (398.7 g) was calcined in a $ZrO_2$-crucible at 400° C. for 4 hours using a muffle kiln (Heraeus Holding GmbH MR 170 E).

Life Time Test (Method A)

Figure 9:
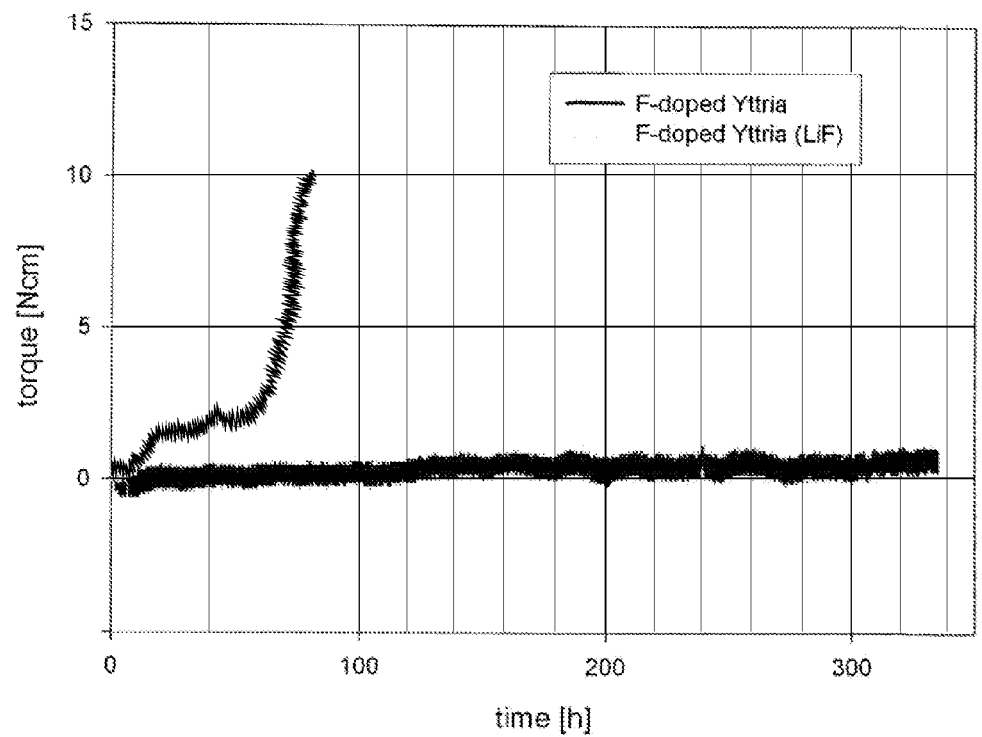
FIG. 9 shows the results of the slurry-lifetime-tests (Method A) in comparison of 1.9 wt % F-doped Yttria (Zirconium oxyfluoride) to 1.7 wt % F-doped Yttria (Lithium fluoride) in Ammonium Zirconium Carbonate (graph-time versus torque).

250 g of the 1.7 wt %-F-doped material were mixed with 75 g of Ammonium Zirconium Carbonate. The first significant increase in slope was observed at 10 hours. (See FIG. 9—Example 6 in comparison to Example 7—Yttria doped with LiF.)

Example 8

6.787 kg fused block material of Y/Al/Zr (95.88/0.12/4.0) were milled for 30 minutes in a ball mill (ZOZ GmbH TYP COMB 03-A03; milling parameters as described in Example 1). After the addition of 213 g (=3 wt %) Yttrium-Fluoride the powder mixture was milled for another 90 minutes. The milled product was sieved <75 tun and then calcined (Nabertherm C250; 1.5 kg per $Al_2O_3$(0.9)-mullite(0.1)-crucible). The heating rate was 1.1° C./min up to a temperature of 550° C. that was maintained for 8 hours.
Life Time Test (Method B)

Figure 10:
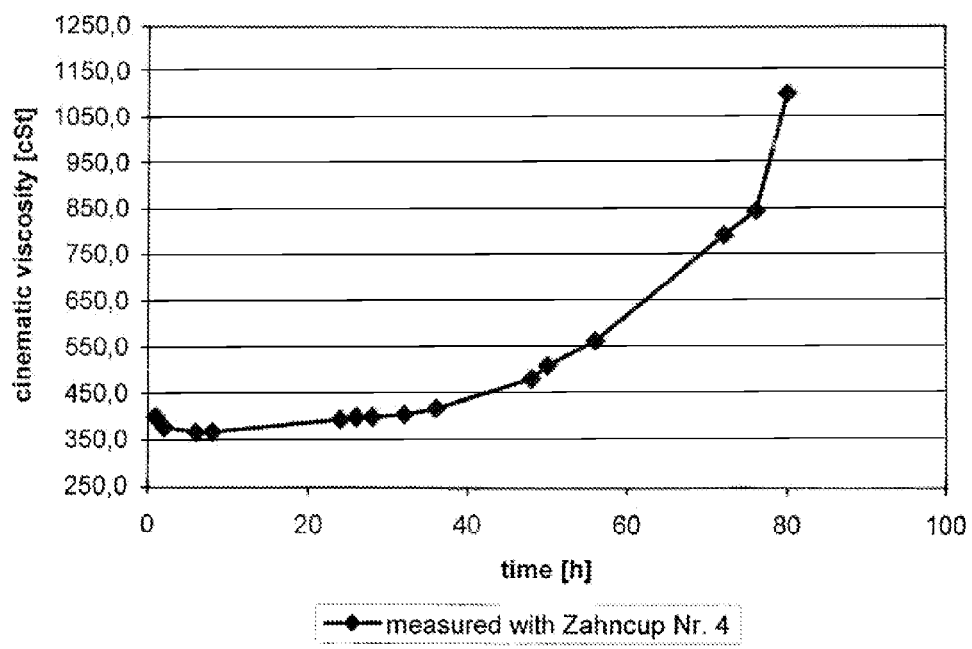
FIG. 10 shows the results of the slurry-lifetime-test (Method B) with 1.0 wt % F-doped Y/Al/Zr-Oxide in Zirconium-Acetate (graph-time versus cinematic viscosity).

1200 g of 1.0 wt % F-doped Y/Al/Zr were mixed with 300 g of Zirconium Acetate. After one hour the initial viscosity was 400 cSt. The slurry lifetime added to 72 hours, at this point the start viscosity has doubled (FIG. 10).

Example 9

6.664 kg fused block material of Y/Al/Zr-Oxide (95.88/0.12/4.0) were milled for 60 minutes in a ball mill (ZOZ GmbH TYP COMB 03-A03; milling parameters as described in Example 1). After the addition of 336 g (=4.8 wt %) Zirconiumoxyfluoride $Zr_7O_{8.79}F_{9.71}$ the powder mixture was milled for another 90 minutes. The milled product was sieved <63 µm and then calcined (Nabertherm C250; 1.5 kg per $Al_2O_3$(0.9)-mullite(0.1)-crucible). The heating rate was 1.1° C./min up to a temperature of 450° C. that was maintained for 4 hours.
Life Time Test (Method B)

Figure 11:
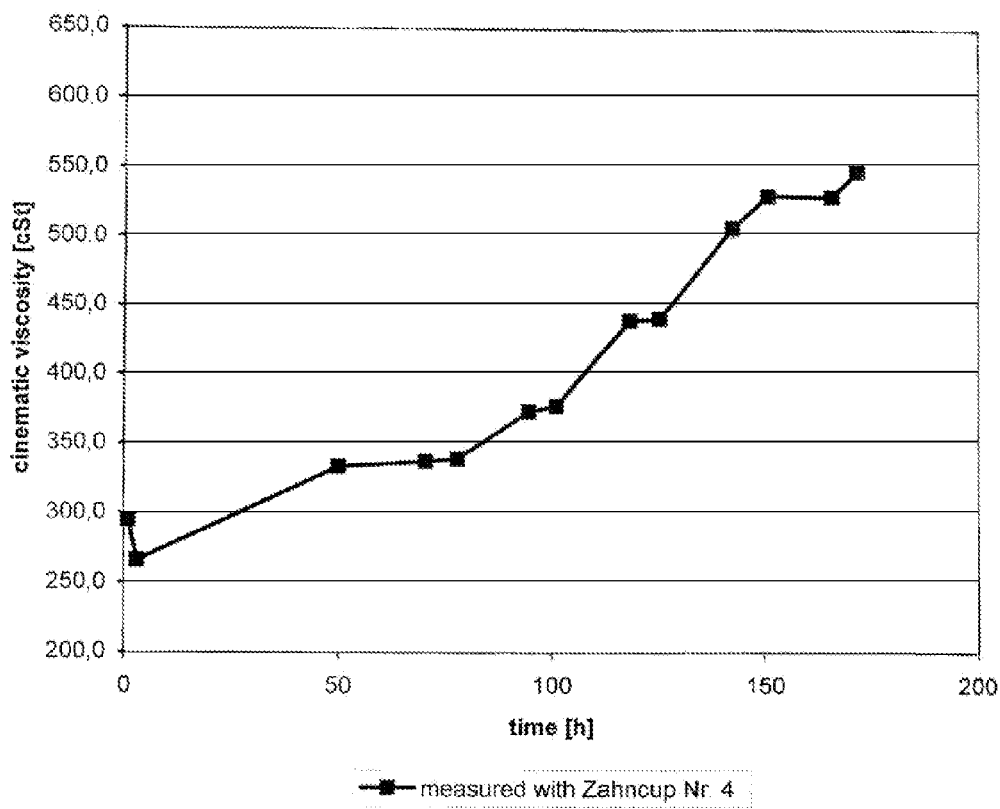
FIG. 11 shows the results of the slurry-lifetime-test (Method B) with 1.1 wt % F-doped Y/Al/Zr-Oxide in Zirconium-Acetate (graph-time versus cinematic viscosity).

1200 g of 1.1 wt % F-doped Y/Al/Zr were mixed with 300 g of Zirconium Acetate. After 171.5 hours the initial viscosity of 295 cSt rose up to 547 cSt. This means that the viscosity increased by 85% after 171.5 hours. (FIG. 11)

Example 10

6.348 kg fused block material of Y/Al/Zr (95.88/0.12/4.0) were milled for 30 minutes in a ball mill (ZOZ GmbH TYP COMB 03-A03; milling parameters as described in Example 1). After the addition of 652 g (=9.3 wt %) Zirconiumoxyfluoride $Zr_7O_{8.79}F_{9.71}$ the powder mixture was milled for another 120 minutes. The milled product was sieved <63 µm and then calcined (Nabertherm C250; 1.5 kg per $Al_2O_3$(0.9)-mullite(0.1)-crucible). The heating rate was 1.1° C./min up to a temperature of 650° C., that was held for 13 hours.
Life Time Test (Method B)

1200 g of 2.2 wt % F-doped Y/Al/Zr were mixed with 360 g of Ammonium Zirconium Carbonate. The initial viscosity of 314 cSt doubled after 28.7 hours.

Example 11

Powder production according to Example 10. The heating rate of the calcination was 1.1° C./min up to a temperature of 450° C., that was maintained for 7 hours.
Life Time Test (Method B)

Figure 12:
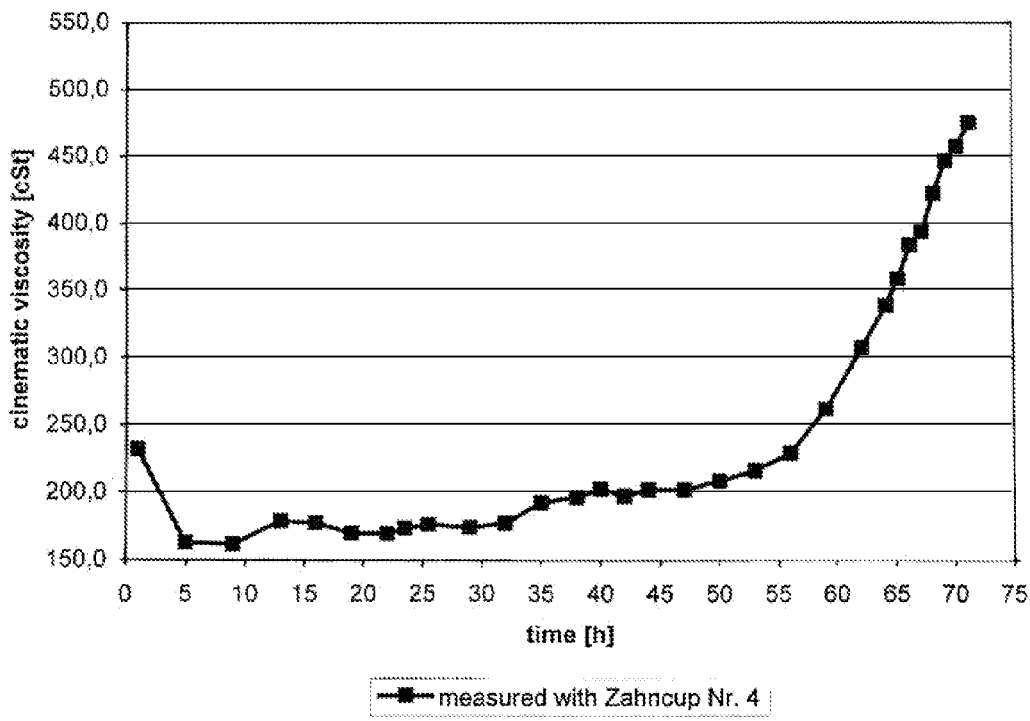
FIG. 12 shows the results of the slurry-lifetime-test (Method B) with 2.4 wt % F-doped Y/Al/Zr-Oxide in Ammonium Zirconium Carbonate (graph-time versus cinematic viscosity).

1200 g of 2.4 wt % F-doped Y/Al/Zr were mixed with 360 g of Ammonium Zirconium Carbonate. After 70.3 hours the initial viscosity of 232 cSt doubled (see FIG. 12).

X-Ray-Diffraction (XRD) Analysis

Figure 13:
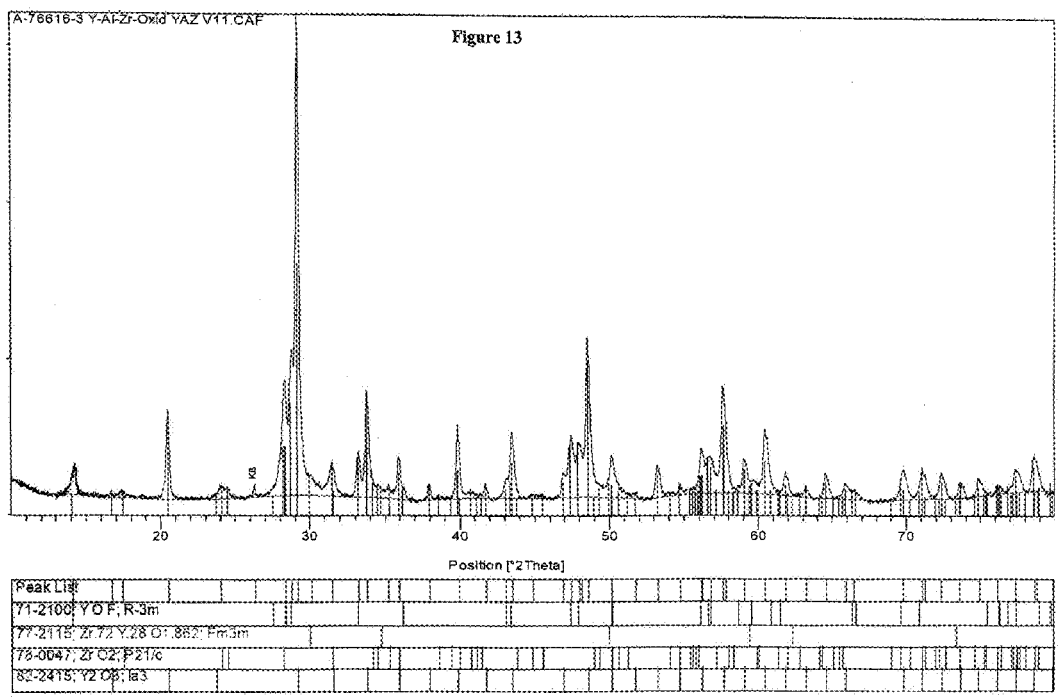
FIG. 13 shows the XRD-analysis of 2.4 wt % F-doped Y/Al/Zr-Oxide.

A XRD-analysis of the material described in Example 11 was made. The detected phases are $Y_2O_3$, $ZrO_2$, YOF and $Zr_{0.72}Y_{0.28}O_{1.862}$ (FIG. 13).
Transmission Electron Microscopy (TEM)-Analysis A TEM analysis of the material described in Example 11 was made at the Austrian Centre for Electron Microscopy and Nanoanalysis in Graz. Therefore a lamella out of a grain, that showed a Fluorine-peak at the precedent Energy dispersive X-ray spectroscopy (EDX), was removed using Focused Ion Beam (FIB).

Figure 14:
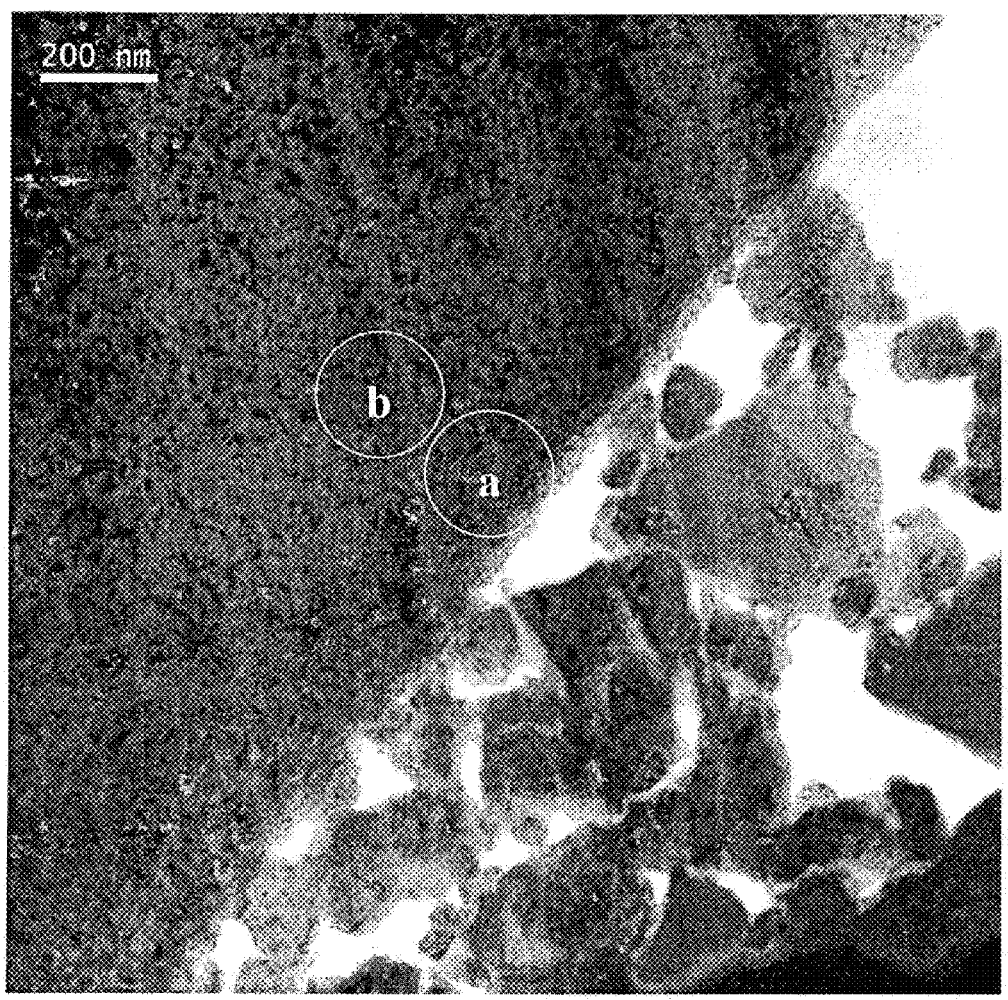
FIG. 14 is the TEM picture of 2.4 wt % F-doped Y/Al/Zr-Oxide, where via electron energy loss spectroscopy a Fluorine-signal can be detected at the grain boundary area; 200 nm below the boundary area, there exists no Fluorine-peak.
Figure 14A:
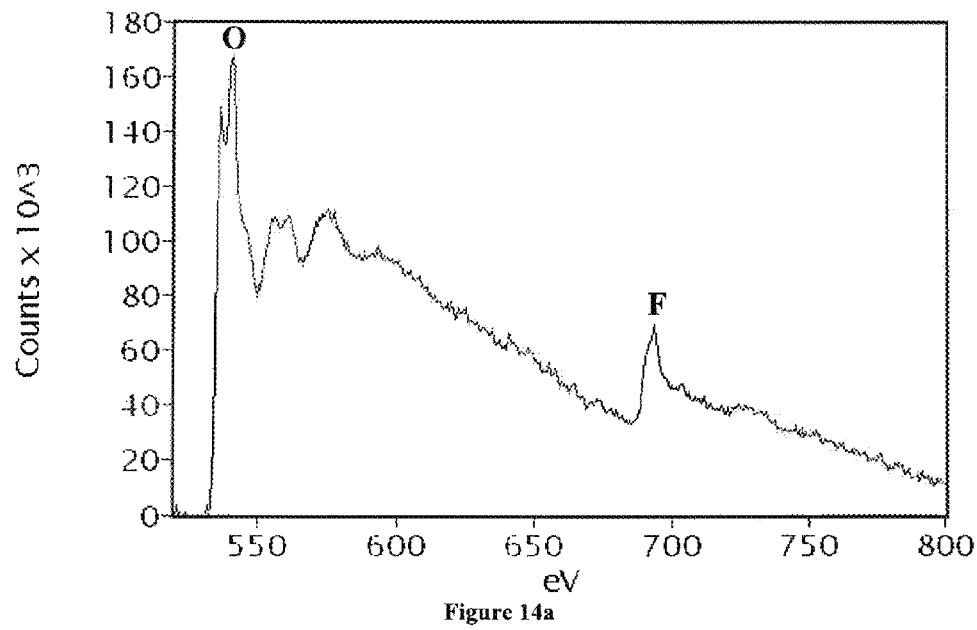
Figure 14B:
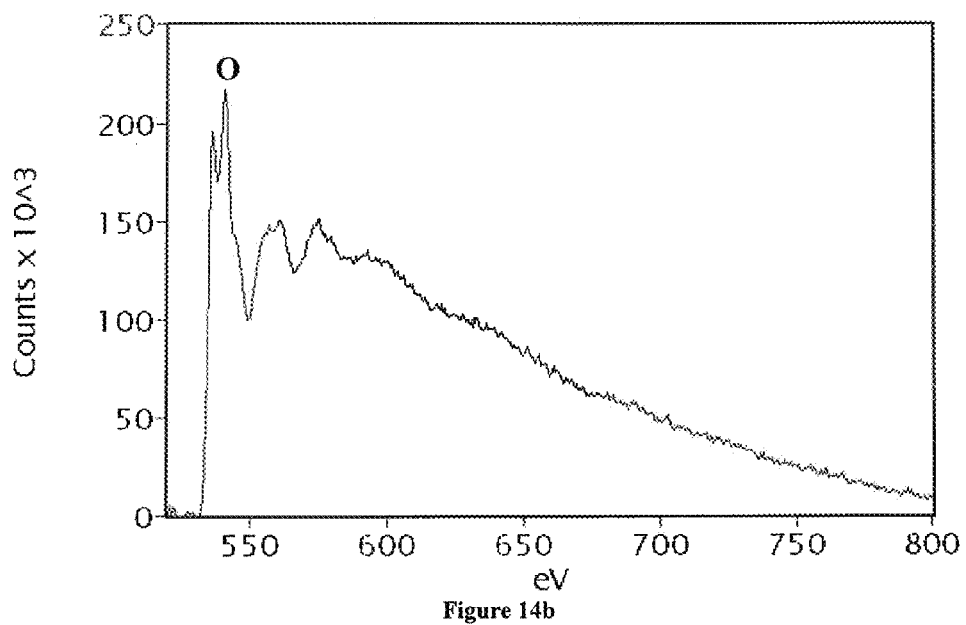
Figure 15:
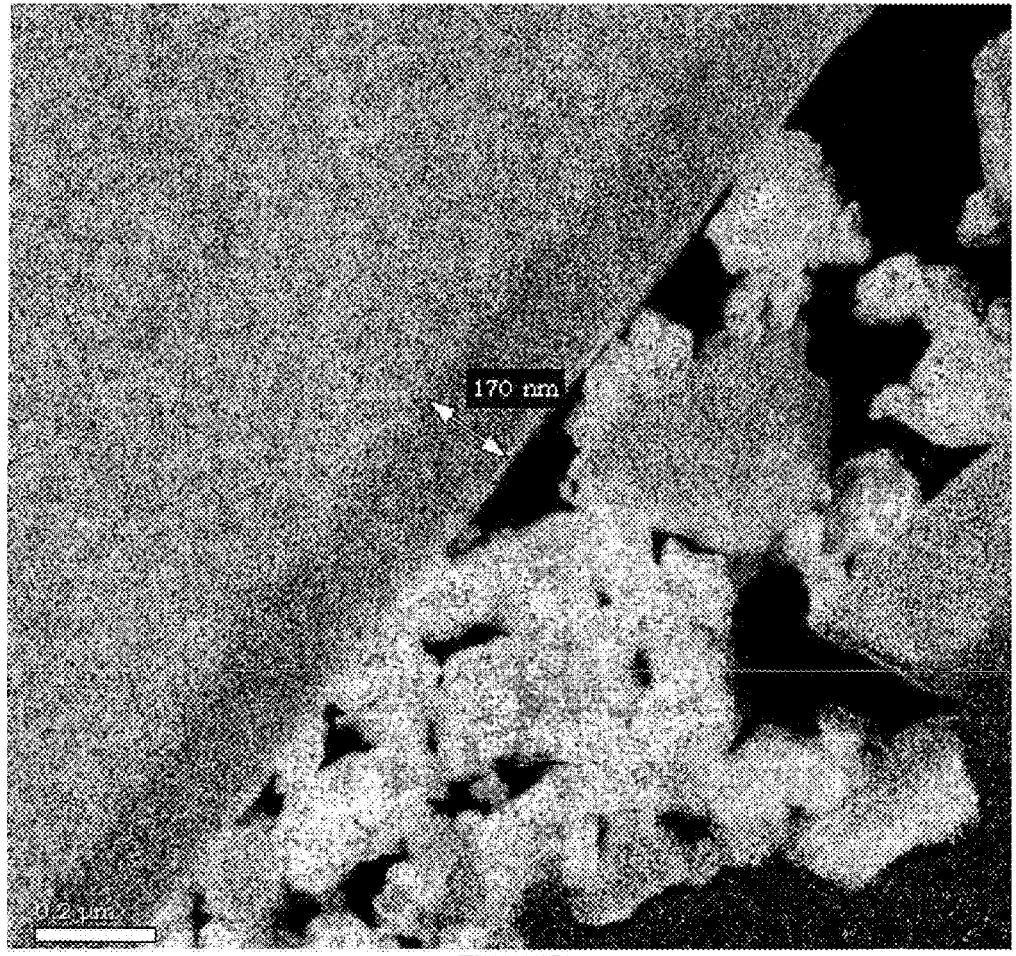
FIG. 15. is the Jump-ratio image (elemental maping of oxygen) of 2.4 wt % F-doped Y/Al/Zr-Oxide, where a 170 nm wide layer of YOF can be observed along the grain boundary.
Figure 16:
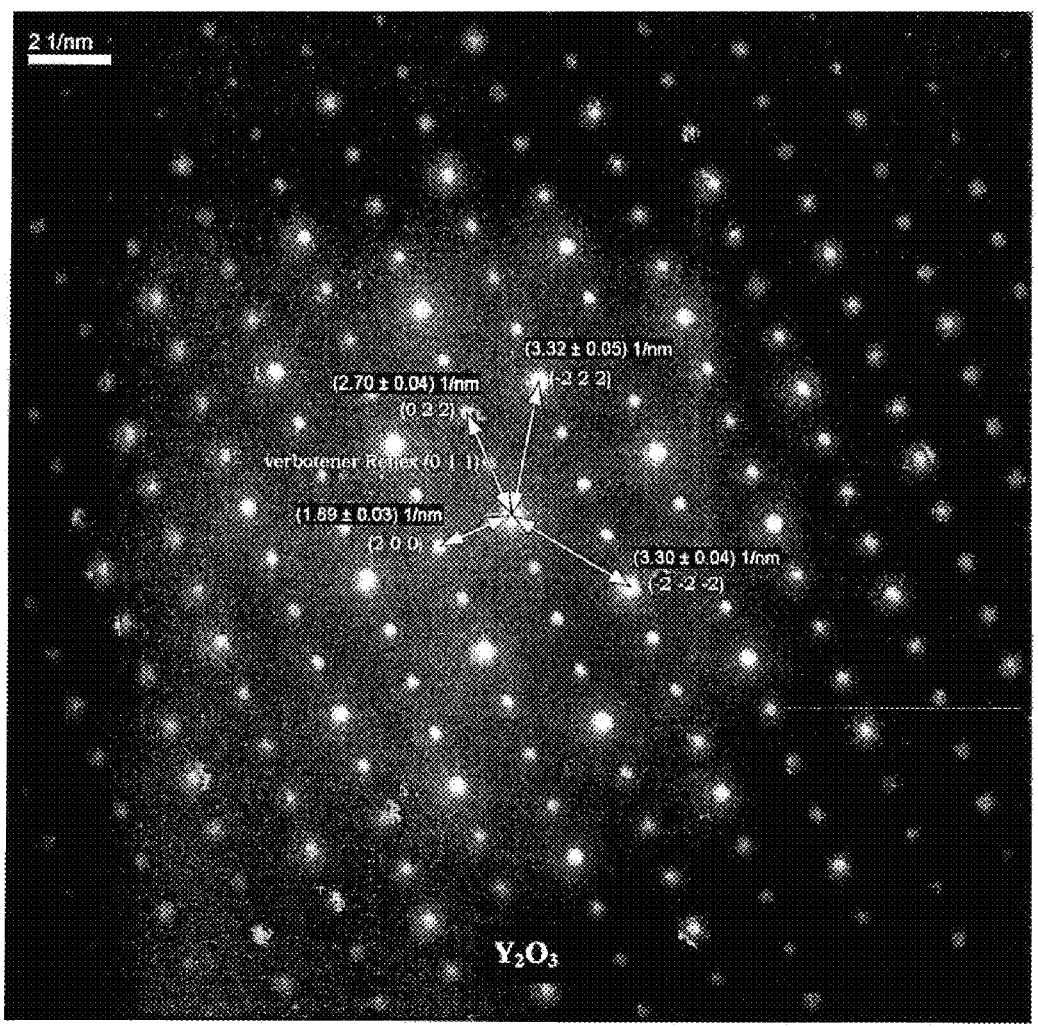
FIG. 16 is the diffraction image of the inside of the grain of 2.4 wt % F-doped Y/Al/Zr-Oxide, where $Y_2O_3$ can be verified.
Figure 17:
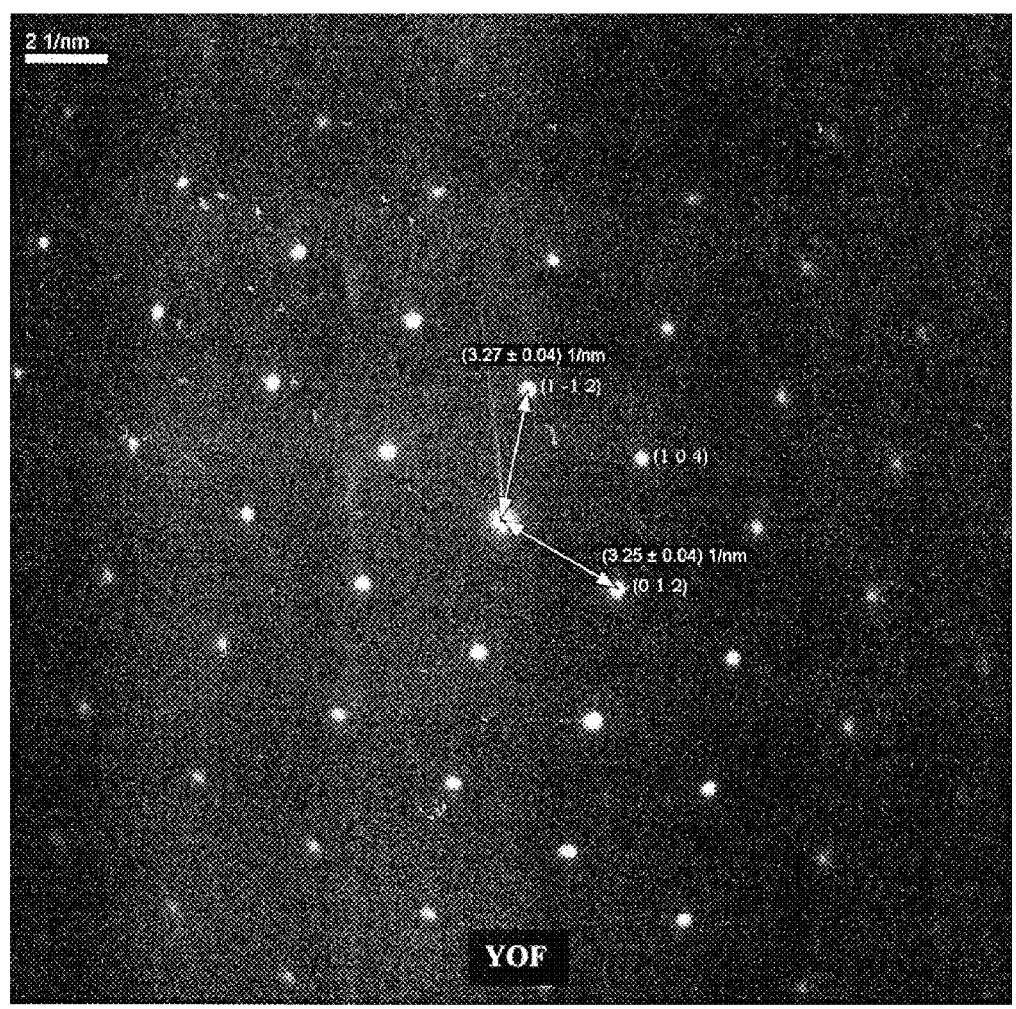
FIG. 17 is the diffraction image of the boundary grain of 2.4 wt % F-doped Y/Al/Zr-Oxide, where YOF can be verified.

Via electron energy loss spectroscopy a Fluorine-signal could be detected at the grain boundary area. (see FIG. 14). 200 nm below the boundary area, there exist no Fluorine-peak. At the so called Jump-ratio image (eliminating the background signal by dividing the signal image by a background image) a 170 nm wide layer along the grain boundary is apparent (FIG. 15—elemental map of oxygen) that is verified as Yttrium-Oxy-Fluoride in the following. At the diffraction images of the inside of the grain $Y_2O_3$ can be detected (FIG. 16) and at the diffraction image of the grain boundary the chemical compound Yttrium-Oxyfluoride (YOF) can definitely be verified (FIG. 17). Via EDX the element Zirconium can also be detected in the layer at the surface of the grain.

Example 12

6.520 kg fused block material of Y/Al/Zr (95.88/0.12/4.0) were milled for 30 minutes in a ball mill (ZOZ GmbH TYP COMB 03-A03; milling parameters as described in Example 1). After the addition of 480 g (=6.9 wt %) Zirconiumoxyfluoride $Zr_7O_{8.79}F_{9.71}$ the powder mixture was milled for another 120 minutes. The milled product was sieved <63 µm and then calcined (Nabertherm C250; 1.5 kg per $Al_2O_3$(0.9)-mullite(0.1)-crucible). The heating rate was 1.1° C./min up to a temperature of 400° C., that was maintained for 4 hours.
Life Time Test (Method B)

1100 g of 1.7 wt % F-doped Y/Al/Zr were mixed with 304.7 g of Ammonium Zirconium Carbonate. The formulated slurry showed a lifetime of 44.9 hours.

Example 13

6.974 kg fused block material of Y/Al/Zr (95.88/0.12/4.0) were milled for 30 minutes in a ball mill (ZOZ GmbH TYP COMB 03-A03; 20 kg 1.25" grinding-balls (Yttria stabilized Zirconium Oxide—other milling parameters as described in Example 1). After the addition of 0.026 kg (=0.37 wt %) Zirconiumoxyfluoride $Zr_7O_{8.79}F_{9.71}$ the powder mixture was milled for another 120 minutes. The milled product was sieved <63 µm and then calcined (Nabertherm C250; 1.5 kg per $Al_2O_3$(0.9)-mullite(0.1)-crucible). The heating rate was 1.1° C./min up to a temperature of 400° C., that was maintained for 4 hours.
Life Time Test (Method B)

1200 g of 0.1 wt % F-doped Y/Al/Zr were mixed with 360 g of Ammonium Zirconium Carbonate. The formulated slurry showed a lifetime of 21.6 hours.

Example 14

5.212 kg fused block material of Y/Al/Zr (95.88/0.12/4.0) were milled for 30 minutes in a ball mill (ZOZ GmbH TYP COMB 03-A03; 20 kg 1.25" grinding-balls (Yttria stabilized Zirconium Oxide—other milling parameters as described in Example 1). After the addition of 1.788 kg (=25.5 wt %)

Zirconiumoxyfluoride $Zr_7O_{8.79}F_{9.71}$ the powder mixture was milled for another 120 minutes. The milled product was sieved <63 μm and then calcined (Nabertherm C250; 1.5 kg per $Al_2O_3(0.9)$-mullite(0.1)-crucible). The heating rate was 1.1° C./min up to a temperature of 400° C., that was maintained for 4 hours.
Life Time Test (Method B)

1200 g of 6.9 wt % F-doped Y/Al/Zr were mixed with 440 g of Ammonium Zirconium Carbonate. After a certain time the volume of the slurry was too small to realise Zahncup Nr. 5 measurements. Therefore Rheometer measurements (measuring gap=1 mm) were made. First every weekday, afterwards approximately every week one respectively two measurements were realised. A tendency of slight increase of viscosity could be observed after 110 days, but no significant increase of the viscosity of the formulated slurry could be observed for 152 days. Afterwards the experiment was stopped.

Example 15

6.490 kg fused block material of Yttria were milled for 30 minutes in a ball mill (ZOZ GmbH TYP COMB 03-A03; 20 kg 1.25" grinding-balls (Yttria stabilized Zirconium Oxide—other milling parameters as described in Example 1). After the addition of 0.510 kg (=7.3 wt %) Zirconiumoxyfluoride $Zr_7O_{8.79}F_{9.71}$ the powder mixture was milled for another 90 minutes. The milled product was sieved <63 μm and then calcined (Nabertherm C250; 1.5 kg per $Al_2O_3(0.9)$-mullite(0.1)-crucible). The heating rate was 1.1° C./min up to a temperature of 400° C., that was maintained for 4 hours.
Life Time Test (Method B)

1200 g of 1.9 wt % F-doped Yttriumoxide were mixed with 360 g of Ammonium Zirconium Carbonate. After 74.1 hours the initial viscosity doubled.

Example 16

The production of the F-doped Yttria was carried out as described in Example 15. The heating rate of the calcination was 1.1° C./min up to a temperature of 1100° C., that was maintained for 4 hours.
Life Time Test (Method B)

1200 g of 1.9 wt % F-doped Yttriumoxide were mixed with 360 g of Ammonium Zirconium Carbonate. Due to the temperature treatment at 1100° C. relatively strong agglomerates were formed, in order to disperse the particles homogenously and to break down the agglomerates, powder and binder were mixed additionally to the agitator with an Ultra Turrax T25 (60 sec 17500 l/min and 20 sec 21500 l/min). In this case the initial viscosity is taken from the measurement at 4 hours after the beginning of the experiment. Due to the sample preparation the slurry viscosity at 1 hour was lower (temperature of the slurry was increased) than the arisen balanced viscosity after 4 hours (292 cSt). After 26.5 hours the viscosity has doubled.

Example 17

The production of the F-doped Yttria was carried out as described in Example 15. The heating rate of the calcination was 1.1° C./min up to a temperature of 900° C., that was maintained for 4 hours.
Life Time Test (Method B)

1200 g of 2.0 wt % F-doped Yttriumoxide were mixed with 360 g of Ammonium Zirconium Carbonate. Due to the temperature treatment at 900° C. relatively strong agglomerates were formed, in order to disperse the particles homogenously and to break down the agglomerates, powder and binder were mixed additionally to the agitator with an Ultra Turrax T25 (30 sec 17500 l/min and 10 sec 21500 l/min).
The slurry showed a lifetime of 26.9 hours.

Example 18

The production of the F-doped Yttria was carried out as described in Example 15. The heating rate of the calcinations was 1.1° C./min up to a temperature of 800° C., that was maintained for 4 hours.
Life Time Test (Method B)

1200 g of 1.9% F-doped Yttriumoxide were mixed with 360 g of Ammonium Zirconium Carbonate. Due to the temperature treatment at 800° C. agglomerates were formed, in order to disperse the particles homogenously and to break down the agglomerates, powder and binder were mixed additionally to the agitator with an Ultra Turrax T25 (30 sec 13500 l/min)
The slurry showed a lifetime of 33.4 hours.

Example 19

The production of the F-doped Yttria was carried out as described in Example 15. The heating rate was 1.1° C./min up to a temperature of 300° C., that was maintained for 4 hours.
Life Time Test (Method B)

1200 g of 2.0% F-doped Yttriumoxide were mixed with 360 g of Ammonium Zirconium Carbonate. The slurry showed a lifetime of 50.3 hours.

Example 20

6.569 kg fused block material of Yttria were milled for 30 minutes in a ball mill (ZOZ GmbH TYP COMB 03-A03; 20 kg 1.25" grinding-balls (Yttria stabilized Zirconium Oxide—other milling parameters as described in Example 1). After the addition of 0.431 kg (=6.2 wt %) Yttrium fluoride $YF_3$ the powder mixture was milled for another 90 minutes. The milled product was sieved <63 μm and then calcined (Nabertherm C250; 1.5 kg per $Al_2O_3(0.9)$-mullite(0.1)-crucible). The heating rate was 1.1° C./min up to a temperature of 400° C., that was held for 4 hours.
Life Time Test (Method B)

1200 g of 2.0% F-doped Yttriumoxide were mixed with 360 g of Ammonium Zirconium Carbonate. The slurry showed a lifetime of 35.7 hours.

Example 21

The production of the F-doped Yttria was carried out as described in Example 20. The heating rate of the calcination was 1.1° C./min up to a temperature of 1100° C., that was maintained for 2 hours.
Life Time Test (Method B)

1200 g of 2.0% F-doped Yttriumoxide were mixed with 360 g of Ammonium Zirconium Carbonate. Due to the temperature treatment at 1100° C. relatively strong agglomerates were formed, in order to disperse the particles homogenously and to break down the agglomerates, powder and binder were mixed additionally to the agitator with an Ultra Turrax T25 (2 min 13500 l/min). After 17.1 hours the viscosity has doubled.

Example 22

The production of the F-doped Yttria was carried out as described in Example 20. The heating rate of the calcination was 1.1° C./min up to a temperature of 900° C., that was maintained for 4 hours.

Life Time Test (Method B)

1200 g of 1.9% F-doped Yttriumoxide were mixed with 360 g of Ammonium Zirconium Carbonate.

Due to the temperature treatment at 900° C. relatively strong agglomerates were formed, in order to disperse the particles homogenously and to break down the agglomerates, powder and binder were mixed additionally to the agitator with an Ultra Turrax T25 (30 sec 13500 l/min and 10 sec 17500 l/min).

The shiny showed a lifetime of 16.3 hours.

Example 23

The production of the F-doped Yttria was carried out as described in Example 20. The heating rate of the calcination was 1.1° C./min up to a temperature of 800° C., that was maintained for 4 hours.
Life Time Test (Method B)

1200 g of 1.9% F-doped Yttriumoxide were mixed with 360 g of Ammonium Zirconium Carbonate. Due to the temperature treatment at 800° C. agglomerates were formed, in order to disperse the particles homogenously and to break down the agglomerates, powder and binder were mixed additionally to the agitator with an Ultra Turrax T25 (30 sec 13500 l/min)

The slurry showed a lifetime of 26.1 hours.

Example 24

The production of the F-doped Yttria was carried out as described in Example 20. The heating rate of the calcination was 1.1° C./min up to a temperature of 300° C., that was maintained for 4 hours.
Life Time Test (Method B)

1200 g of 2.1% F-doped Yttriumoxide were mixed with 360 g of Ammonium Zirconium Carbonate. The viscosity doubled after 26.7 hours.

Example 25

6.649 kg fused block material of Y/Al/Zr (95.88/0.12/4.0) were milled for 30 minutes in a ball mill (ZOZ GmbH TYP COMB 03-A03; 20 kg 1.25" grinding-balls (Yttria stabilized Zirconium Oxide—other milling parameters as described in Example 1). After the addition of 0.351 kg (=5.0 wt %) Lanthanum fluoride the powder mixture was milled for another 120 minutes. The milled product was sieved <63 μm and then calcined (Nabertherm C250; 1.5 kg per $Al_2O_3$(0.9)-mullite(0.1)-crucible). The heating rate was 1.1° C./min up to a temperature of 550° C., that was maintained for 4 hours.
Life Time Test (Method B)

1200 g of 1.3% F-doped Y/Al/Zr were mixed with 360 g of Ammonium Zirconium Carbonate. The slurry showed a lifetime of 47.0 hours.

Example 26

6.570 kg fused block material of Y/Al/Zr (95.88/0.12/4.0) were milled for 30 minutes in a ball mill (ZOZ GmbH TYP COMB 03-A03; 20 kg 1.25" grinding-balls (Yttria stabilized Zirconium Oxide—other milling parameters as described in Example 1). After the addition of 0.430 kg (=6.1 wt %). Ytterbium fluoride the powder mixture was milled for another 120 minutes. The milled product was sieved <63 μm and then calcined (Nabertherm C250; 1.5 kg per $Al_2O_3$(0.9)-mullite (0.1)-crucible). The heating rate was 1.1° C./min up to a temperature of 550° C., that was maintained for 4 hours.
Life Time Test (Method B)

1200 g of 1.6% F-doped Y/Al/Zr were mixed with 360 g of Ammonium Zirconium Carbonate. The slurry showed a lifetime of 44.7 hours.

Example 27

6.617 kg fused block material of Y/Al/Zr (50/25/25) were milled for 30 minutes in a ball mill (ZOZ GmbH TYP COMB 03-A03; milling parameters as described in Example 1). After the addition of 0.383 kg (=5.5 wt %) Zirconiumoxyfluoride $Zr_7O_{8.79}F_{9.71}$ the powder mixture was milled for another 120 minutes. The milled product was sieved <63 μm and then calcined (Nabertherm C250; 1.5 kg per $Al_2O_3$(0.9)-mullite (0.1)-crucible). The heating rate was 1.1° C./min up to a temperature of 400° C., that was maintained for 4 hours.
Life Time Test (Method B)

1200 g of 1.7% F-doped Y/Al/Zr were mixed with 380 g of Ammonium Zirconium Carbonate. After a certain time the volume of the slurry was too small to realise Zahncup Nr. 5 measurements. Therefore Rheometer measurements (measuring gap=1 mm) were made. First every weekday, afterwards approximately every week one respectively two measurements were realised. No significant increase of the viscosity of the formulated slurry could be observed for 150 days. Afterwards the experiment was stopped.

The summary of the results is presented in Table 1.

TABLE 1

Summary of the results

| Example | Raw material flour | Dopant flour | Fluorine [wt %] | heating rate [° C./min] | calcination temperature [° C.] | dwell time [h] | Test method | binder system | Ratio binder:flour(:$H_2O$) | Slurry lifetime [h] |
|---|---|---|---|---|---|---|---|---|---|---|
| Comparative Example 1 | Y/Al/Zr-Oxide (95.88/0.12/4) | — | — | — | — | — | Method A | Ammonium Zirconium Carbonate | 1:5.58:0.49 | 0.9 |
| Comparative Example 2 | Y/Al/Zr-Oxide (95.88/0.12/4) | — | — | — | — | — | Method A | Zirconium Acetate | 1:5.58:0.49 | 0.7 |
| 1 | Y/Al/Zr-Oxide (95.88/0.12/4) | $YF_3$ | 0.8 | 5 | 550 | 6 h 50 min | Method A | Zirconium Acetate | 1:5.58:0.49 | 41 |
| 2 | Y/Al/Zr-Oxide (95.88/0.12/4) | $YF_3$ | 0.8 | 5 | 550 | 6 h 50 min | Method A | Ammonium Zirconium Carbonate | 1:5.58:0.49 | 56 |
| 3 | Y/Al/Zr-Oxide (95.88/0.12/4) | Zirkonyl-fluoride | 1.0 | — | 550 | 3 | Method A | Ammonium Zirconium Carbonate | 1:5.58:0.49 | 124 |

TABLE 1-continued

Summary of the results

| Example | Raw material flour | Dopant flour | Fluorine [wt %] | heating rate [° C./min] | calcination temperature [° C.] | dwell time [h] | Test method | binder system | Ratio binder:flour(:$H_2O$) | Slurry lifetime [h] |
|---|---|---|---|---|---|---|---|---|---|---|
| 4 | Y/Al/Zr-Oxide (95.88/0.12/4) | $YF_3$ | 0.9 | 5 | 540 | 8 | Method A | Zirconium Acetate | 1:4 | 66 |
| 5 | Y/Al/Zr-Oxide (95.88/0.12/4) | $ZrF_4$ | 0.8 | — | 550 | 3 | Method A | Ammonium Zirconium Carbonate | 1:5.58:0.49 | 380 |
| 6 | $Y_2O_3$ | $Zr_7O_{8.79}F_{9.71}$ | 1.9 | — | 400 | 4 | Method A | Ammonium Zirconium Carbonate | 1:3.3 | >335 |
| 7 | Y2O3 | LiF | 1.7 | — | 400 | 4 | Method A | Ammonium Zirconium Carbonate | 1:3.3 | 10 |
| Comparative Example 3 | Y/Al/Zr-Oxide (95.88/0.12/4) | — | — | — | — | — | Method B | Ammonium Zirconium Carbonate | 1:3.3 | <3 |
| Comparative Example 4 | Y/Al/Zr-Oxide (95.88/0.12/4) | — | — | — | — | — | Method B | Zirconium Acetate | 1:4 | <35 min |
| Comparative Example 5 | $Y_2O_3$ | — | — | — | — | — | Method B | Ammonium Zirconium Carbonate | 1:3.3 | <3 |
| 8 | Y/Al/Zr-Oxide (95.88/0.12/4) | $YF_3$ | 1.0 | 1.1 | 550 | 8 | Method B | Zirconium Acetate | 1:4 | 72 |
| 9 | Y/Al/Zr-Oxide (95.88/0.12/4) | $Zr_7O_{8.79}F_{9.71}$ | 1.1 | 1.1 | 450 | 4 | Method B | Zirconium Acetate | 1:4 | After 171.5 hours start-η increased by 85% |
| 10 | Y/Al/Zr-Oxide (95.88/0.12/4) | $Zr_7O_{8.79}F_{9.71}$ | 2.2 | 1.1 | 650 | 13 | Method B | Ammonium Zirconium Carbonate | 1:3.3 | 28.7 |
| 11 | Y/Al/Zr-Oxide (95.88/0.12/4) | $Zr_7O_{8.79}F_{9.71}$ | 2.4 | 1.1 | 450 | 7 | Method B | Ammonium Zirconium Carbonate | 1:3.3 | 70.3 |
| 12 | Y/Al/Zr-Oxide (95.88/0.12/4) | $Zr_7O_{8.79}F_{9.71}$ | 1.7 | 1.1 | 400 | 4 | Method B | Ammonium Zirconium Carbonate | 1:3.6 | 44.9 |
| 13 | Y/Al/Zr-Oxide (95.88/0.12/4) | $Zr_7O_{8.79}F_{9.71}$ | 0.1 | 1.1 | 400 | 4 | Method B | Ammonium Zirconium Carbonate | 1:3.3 | 21.6 |
| 14 | Y/Al/Zr-Oxide (95.88/0.12/4) | $Zr_7O_{8.79}F_{9.71}$ | 6.9 | 1.1 | 400 | 4 | Method B | Ammonium Zirconium Carbonate | 1:2.7 | >110 days |
| 15 | $Y_2O_3$ | $Zr_7O_{8.79}F_{9.71}$ | 1.9 | 1.1 | 400 | 4 | Method B | Ammonium Zirconium Carbonate | 1:3.3 | 74.1 |
| 16 | $Y_2O_3$ | $Zr_7O_{8.79}F_{9.71}$ | 1.9 | 1.1 | 1100 | 4 | Method B | Ammonium Zirconium Carbonate | 1:3.3 | 26.5 |
| 17 | $Y_2O_3$ | $Zr_7O_{8.79}F_{9.71}$ | 2.0 | 1.1 | 900 | 4 | Method B | Ammonium Zirconium Carbonate | 1:3.3 | 26.9 |
| 18 | $Y_2O_3$ | $Zr_7O_{8.79}F_{9.71}$ | 1.9 | 1.1 | 800 | 4 | Method B | Ammonium Zirconium Carbonate | 1:3.3 | 33.4 |
| 19 | $Y_2O_3$ | $Zr_7O_{8.79}F_{9.71}$ | 2.0 | 1.1 | 300 | 4 | Method B | Ammonium Zirconium Carbonate | 1:3.3 | 50.3 |
| 20 | $Y_2O_3$ | $YF_3$ | 2.0 | 1.1 | 400 | 4 | Method B | Ammonium Zirconium Carbonate | 1:3.3 | 35.7 |
| 21 | $Y_2O_3$ | $YF_3$ | 2.0 | 1.1 | 1100 | 2 | Method B | Ammonium Zirconium Carbonate | 1:3.3 | 17.1 |
| 22 | $Y_2O_3$ | $YF_3$ | 1.9 | 1.1 | 900 | 4 | Method B | Ammonium Zirconium Carbonate | 1:3.3 | 16.3 |
| 23 | $Y_2O_3$ | $YF_3$ | 1.9 | 1.1 | 800 | 4 | Method B | Ammonium Zirconium Carbonate | 1:3.3 | 26.1 |
| 24 | $Y_2O_3$ | $YF_3$ | 2.1 | 1.1 | 300 | 4 | Method B | Ammonium Zirconium Carbonate | 1:3.3 | 26.7 |
| 25 | Y/Al/Zr-Oxide (95.88/0.12/4) | $LaF_3$ | 1.3 | 1.1 | 550 | 4 | Method B | Ammonium Zirconium Carbonate | 1:3.3 | 47.0 |

TABLE 1-continued

Summary of the results

| Example | Raw material flour | Dopant flour | Fluorine [wt %] | heating rate [° C./min] | calcination temperature [° C.] | dwell time [h] | Test method | binder system | Ratio binder:flour(:H$_2$O) | Slurry lifetime [h] |
|---|---|---|---|---|---|---|---|---|---|---|
| 26 | Y/Al/Zr-Oxide (95.88/0.12/4) | YbF$_3$ | 1.6 | 1.1 | 550 | 4 | Method B | Ammonium Zirconium Carbonate | 1:3.3 | 44.7 |
| 27 | Y/Al/Zr-Oxide (50/25/25) | Zr$_7$O$_{8.79}$F$_{9.71}$ | 1.7 | 1.1 | 400 | 4 | Method B | Ammonium Zirconium Carbonate | 1:3.2 | >150 days |

The invention claimed is:

1. Yttria-based refractory composition obtainable by a method comprising:
   (a) mechanically mixing particles of an yttria-based ceramic material and a fluorine-containing dopant other than an an alkali metal fluoride, wherein said yttria-based ceramic material comprises Y/Al/Zr oxide or Y/Zr oxide, from 50 wt.% up to less than 100 wt.% Y$_2$O$_3$, 0-50 wt.% Al$_2$O$_3$, and more than 0% and up to 50 wt.% ZrO$_2$, and
   (b) heating the resulting mixture to a temperature within a range of 300-800° C. to effect fluorine-doping of said yttria-based ceramic material and yield an yttria-based ceramic material doped with fluorine.

2. Yttria-based refractory composition according to claim 1, wherein said fluorine-containing dopant is selected from the group consisting of YF$_3$, AlF$_3$, ZrF$_4$, lanthanide fluorides, and zirconium oxyfluoride.

3. Yttria-based refractory composition according claim 2, wherein the yttria-based refractory composition comprises 0.1-7.5 wt.% fluorine.

4. Yttria-based refractory composition obtainable by a method comprising:
   (a) mechanically mixing particles of an yttria-based ceramic material and a fluorine-containing dopant other than an alkali metal fluoride, wherein said yttria-based ceramic material comprises Y/Al/Zr oxide or Y/Zr oxide, from 50 wt.% up to less than 100 wt.% Y$_2$O$_3$, 0-50 wt.% Al$_2$O$_3$, and more than 0% and up to 50 wt.% ZrO$_2$; and
   (b) heating the resulting mixture to a temperature within a range of 300-800° C. to effect fluorine-doping of said yttria-based ceramic material and yield an yttria-based ceramic material doped with fluorine,
   wherein the yttria-based refractory composition comprises 0.1-7.5 wt.% fluorine.

5. Yttria-based refractory composition obtainable by a method comprising:
   (a) mechanically mixing particles of an yttria-based ceramic material and a fluorine-containing dopant, wherein said yttria-based ceramic material comprises Y/Al/Zr oxide or Y/Zr oxide and said fluorine-containing dopant is selected from the group consisting of YF$_3$, AlF$_3$, ZrF$_4$, lanthanide fluorides, and zirconium oxyfluoride; and
   (b) heating the resulting mixture to a temperature within a range of 300-800° C. to effect fluorine-doping of said yttria-based ceramic material and yield an yttria-based ceramic material doped with fluorine,
   wherein the yttria-based refractory composition comprises 0.1-7.5 wt.% fluorine.

6. Yttria-based refractory composition according to claim 1, wherein said yttria-based ceramic material comprises Y/Al/Zr oxide.

7. Yttria-based refractory composition according to claim 1, wherein said yttria-based ceramic material comprises Y/Zr oxide.

8. Yttria-based refractory composition according to claim 4, wherein said yttria-based ceramic material comprises Y/Al/Zr oxide.

9. Yttria-based refractory composition according to claim 4, wherein said yttria-based ceramic material comprises Y/Zr oxide.

10. Yttria-based refractory composition according to claim 5, wherein said yttria-based ceramic material comprises Y/Al/Zr oxide.

11. Yttria-based refractory composition according to claim 5, wherein said yttria-based ceramic material comprises Y/Zr oxide.

* * * * *

UNITED STATES PATENT AND TRADEMARK OFFICE
CERTIFICATE OF CORRECTION

PATENT NO. : 8,372,769 B2  
APPLICATION NO. : 13/114529  
DATED : February 12, 2013  
INVENTOR(S) : Janz et al.

Page 1 of 1

It is certified that error appears in the above-identified patent and that said Letters Patent is hereby corrected as shown below:

In the Specification

<u>Column 15</u>
Line 10, change "shiny" to --slurry--

Signed and Sealed this
Thirtieth Day of July, 2013

Teresa Stanek Rea
*Acting Director of the United States Patent and Trademark Office*